United States Patent
Endo et al.

[19]

[11] Patent Number: 6,035,210
[45] Date of Patent: Mar. 7, 2000

[54] TRANSMISSION POWER CONTROL APPARATUS FOR A MOBILE COMMUNICATION SYSTEM

[75] Inventors: Hiroya Endo; Masahiko Yahagi, both of Tokyo, Japan

[73] Assignee: NEC Corporation, Tokyo, Japan

[21] Appl. No.: 08/982,307

[22] Filed: Dec. 1, 1997

[30] Foreign Application Priority Data

May 12, 1996 [JP] Japan .................................. 8-325679

[51] Int. Cl.[7] .................................................. H04B 7/00
[52] U.S. Cl. .......................... 455/522; 455/69; 455/561; 370/252; 370/332
[58] Field of Search ........................... 455/69, 522, 67.1, 455/561; 370/252, 332, 335, 333; 375/200

[56] References Cited

U.S. PATENT DOCUMENTS

| | | | |
|---|---|---|---|
| 5,574,972 | 11/1996 | Hulbert ...................................... | 455/69 |
| 5,727,033 | 3/1998 | Weaver et al. ........................... | 375/358 |
| 5,839,056 | 11/1998 | Hakkinen ................................... | 455/69 |
| 5,873,028 | 2/1999 | Nakano et al. .......................... | 455/69 |
| 5,898,682 | 4/1999 | Kanai ....................................... | 370/331 |
| 5,920,823 | 7/1999 | Murai ....................................... | 455/522 |
| 5,926,747 | 7/1999 | Komara et al. ........................... | 455/69 |
| 5,933,781 | 8/1999 | Willenegger et al. .................. | 455/522 |

FOREIGN PATENT DOCUMENTS

| 7-30482 | 1/1995 | Japan . |
|---|---|---|
| 7-336291 | 12/1995 | Japan . |

OTHER PUBLICATIONS

An Overview of the Application of Code Division Multiple Access (CDMA) to Digital Cellular Systems and Personal Cellular Networks. (1992).

*Primary Examiner*—Reinhard J. Eisenzopf
*Assistant Examiner*—Darnell R. Armstrong
*Attorney, Agent, or Firm*—Foley & Lardner

[57] ABSTRACT

A transmission power control apparatus capable of reducing interference, in a mobile communication adopting the CDMA system, with other communications by decreasing transmission power in one direction of channel taking communication quality of other channel of direction into account is provided. A reverse channel error rate judgment section for judging a communication quality of the reverse channel by a reverse channel frame error rate detected and a forward channel error rate judgment section for judging a communication quality of the forward channel by a forward channel frame error rate reported by a mobile terminal are provided in the radio base station. The forward channel error rate judgment section, when detected, reports the state of communication degradation of own direction of channel to the reverse channel error rate judgment section which, in turn, controls to instruct the mobile terminal to decrease transmission power of the reverse channel. When communication degradation is detected by the reverse channel error rate judgment section, the state is reported to the forward channel error rate judgment section to control to decrease transmission power of the forward channel.

25 Claims, 13 Drawing Sheets

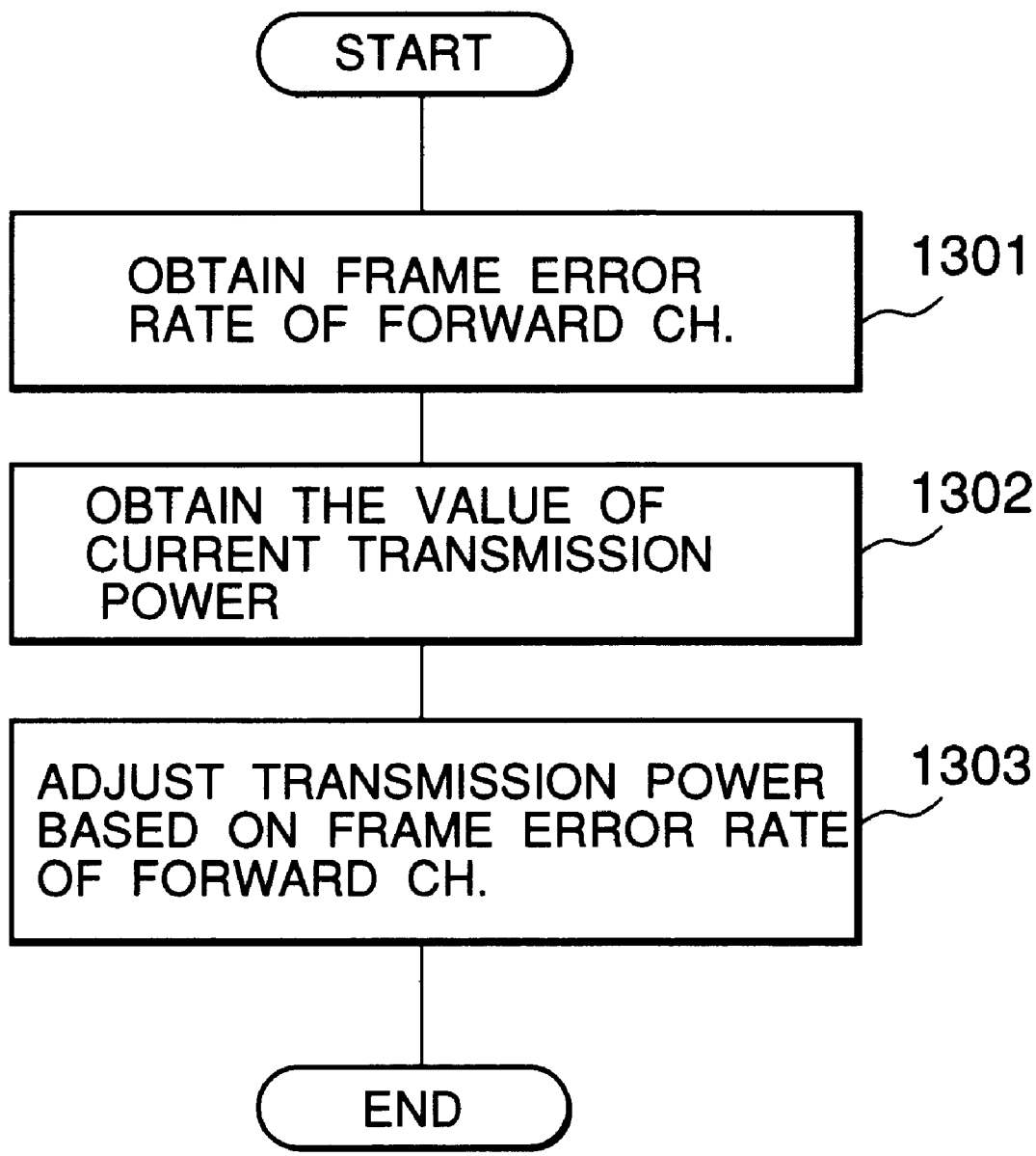

6,035,210

TRANSMISSION POWER CONTROL APPARATUS FOR A MOBILE COMMUNICATION SYSTEM

BACKGROUND OF THE INVENTION

1. Field of the Invention

This invention relates to a transmission power control apparatus for a mobile communication system, and more particularly, to a transmission power control apparatus for controlling a transmission power of radio signals taking respective radio communication qualities of a forward channel (a channel direction from a radio base station to a mobile terminal) and a reverse channel (a channel direction from a mobile terminal to a radio base station) in a mobile communication system, in which the code division multiple access (CDMA) system is used for a communication between a radio base station and a mobile terminal, into consideration.

2. Description of the Related Art

One example of conventional device conguration related to a transmission power control in a radio base station of a mobile communication system using the CDMA system is disclosed in a literature, "An Overview of the Application of Code Division Multiple Access (CDMA) to Digital Cellular Systems and Personal Cellular Networks."

FIG. 11 is a block diagram illustrating such conventional device configuration, and its control operation is shown in FIGS. 12 and 13. FIG. 12 is a flowchart illustrating a conventional control operation of the output signal power for the reverse channel and FIG. 13 is a flowchart of a conventional control operation of the output signal power for the forward channel respectively.

In a transmission power control, two types of transmission power control are involved. One is a transmission power control of radio signals for the reverse channel from the mobile terminal and another is a transmission power control of radio signals for the forward channel from the radio base station, and in the conventional transmission power contorl, these two types of transmission power control are performed independently each other.

The conventional transmission power control of radio signals for the reverse channel is described below with referring to FIGS. 11 and 12.

In the radio base station, a reception field strength of received radio signals of the reverse channel is measured by a digital demodulating section 1101 (Step 1201), and then it is reported to a reception field strength judgment section 1104. In a decoder section 1102, an error of received data is detected (Step 1202), and then the result is reported to a reverse channel error rate judgment section 1103.

In the reverse channel error rate judgment section 1103, the reported result of the error detection is stored for a certain period (for example two sec), and then a frame error rate is calculated based on the stored results (Step 1203 to 1205). In addition, in the reverse channel error rate judgment section 1103, an expected frame error rate has been set previously and an expected reception field strength has been calculated based on the expected value of the frame error rate. Furthermore, in the reverse channel error rate judgment section 1103, the value of the expected reception field strength is modified based on the calculated frame error rate and new expected reception field strength is set (Step 1206), and then it is reported to the reception field strength judgment section 1104.

In the reception field strength judgment section 1104, when receiving radio signals from the mobile terminal, the expected reception field strength previously reported by the reverse channel error rate judgment section 1103 is compared with the reception field strength of the radio signals from the mobile terminal (the reverse channel) which has been measured and reported by the digital demodulating section 1101 (Step 1207). If the reception field strength is greater than the expected reception field strength, an instruction to decrease the transmission power of the mobile terminal is transferred to the mobile terminal by means of radio signals of the forward channel from the radio base station (Step 1209). If the reception field strength is smaller than the expected reception field strength, the instruction to increase the transmission power of the mobile terminal is transferred to the mobile terminal in the same manner (Step 1208).

The transmission power control for the forward channel is described below with referring to FIGS. 11 and 13.

In the mobile terminal, a frame error rate of the received radio signals of the forward channel is measured. Then, the result of measurement is reported to the radio base station on the reverse channel at certain intervals (for example, two sec). In the radio base station, the decoder section 1102 obtains a frame error rate of radio signals of the forward channel which has been measured by the mobile terminal set in the received data (Step 1301), and then reports it to an output power control section 1106. The output power control section 1106 stores the value of transmission power of the current radio base station, and when a frame error rate is reported by the decoder section 1102, it increases or decreases the transmission power by controlling an amplification adjustment section 1107 according to the value of the frame error rate so that the frame error rate stays in a certain range (Steps 1302 to 1303).

In Japanese Non-examined Patent Publication No. 7-030482, there is disclosed a technology that a radio base station measures a frame error rate of radio signals of a reverse channel to control a transmission power of a radio base station and the mobile terminal measures a frame error rate of radio signals of a forward channel to control a transmission power of the mobile terminal.

In a transmission power control in conventional technologies, a power of radio signals transmitted from the radio base station is controlled independently of a control of a power of radio signals transmitted from the mobile terminal.

In a mobile communication using the CDMA system, a channel is formed by a spread code modulation using the same frequency, whereby orthogonality between the codes is insufficient and therefore an interference easily occurs between channels not only for different cells but also for the same cell. Particularly, the reverse channel (from the mobile terminal to the radio base station) is effected by an interference level fluctuation or a deviation caused by a fading or a difference of propagation distances.

If a radio communication quality of one of channels of the forward channel and the reverse channel is degraded, it is sufficient for a radio communication quality of a channel in the other direction to have the same degraded level of communication quality, and it is better to cope with this occasion by moving a position of the mobile terminal or performing a hard-over operation or the like from a viewpoint of reducing interference in the case of a mobile communication adopting the CDMA system. In the transmission power control in the conventional technique, however, a channel in one direction is controlled independently of a channel in the other direction, and therefore a transmission power of a channel whose radio communication quality is not degraded is kept without any changes, whereby radio signals may be transmitted with an excessive power in some circumstances.

Accordingly, if a radio communication quality of either a reverse channel or a forward channel is degraded and it is not improved, there is such a problem in a mobile communication adopting the CDMA system when applying a transmission power control in the conventional technology that excessive interference is given to a communication between another mobile terminal in the same cell or in an adjacent cell and the radio base station.

SUMMARY OF THE INVENTION

According to the present invention, there is provided a transmission power control apparatus of a mobile communication system which solves the problems set forth above. In case of a continuous degradation of a radio communication quality of a channel in one direction, according to the present invention, a transmission power of radio signals of the other channel is decreased to avoid other communications from being interfered, in other words, a transmission power in each direction is controlled taking into consideration the state of the channel in the other direction.

The present invention is a transmission power control apparatus provided in a radio base station of a mobile communication system adopting a CDMA system. The mobile terminal, in the mobile communication system, includes a radio signal reception and transmission device for radio communication with the radio base station, and a forward channel error measuring device for measuring a frame error rate of the forward channel radio signals from the radio base station so as to report it as a forward channel frame error rate to the radio base station. The radio base station includes a radio signal transmission and reception device for radio communication with the mobile terminal, a reverse channel error detecting device for detecting received data errors of the reverse channel radio signals from the mobile terminal, and a reception field strength measuring device for measuring a reception field strength of the reverse channel radio signals.

The transmission power control apparatus under above circumstances comprising:

(1) a communication quality of the forward channel judging part for verifying communication quality of the forward channel based on the forward channel frame error rate reported from the mobile terminal, and judging a communication quality degradation when the forward channel frame error rate reported being worse than a predetermined threshold value with expecting no improvement; and (2) a transmission power control part for controlling the transmission power of the forward channel based on the forward channel frame error rate reported, and controlling the transmission power of the reverse channel by providing instruction information of a transmission power increase to the mobile terminal when the reception field strength value actually having been measured being lower than an expected reception field strength value, based on the reverse channel frame error rate calculated, as the result of comparison, and providing instruction information of a transmission power decrease to the mobile terminal when the reception field strength value actually having been measured being higher than the expected reception field strength value, wherein the expected reception field strength value being set to a lower value than usual when having received the information of communication quality degradation of the forward channel from the communication quality of the forward channel judging part.

The transmission power control apparatus according to the present invention also comprising:

(1) a forward channel transmission power controller for controlling a transmission power of the forward channel radio signals based on the forward channel frame error rate obtained by a report from the mobile terminal, judging communication quality of the forward channel based on the forward channel frame error rate, and outputting information of communication quality degradation of the forward channel when judging result indicating the forward channel frame error rate being worse than a predetermined threshold value and expecting no improvement; and (2) a reverse channel transmission power controller for comparing an expected reception field strength value, based on the reverse channel frame error rate calculated, with the reception field strength value of the reverse channel radio signals actually having been measured, and providing instruction information of a transmission power increase to the mobile terminal when the reception field strength value actually having been measured being lower than the expected reception field strength value, and providing instruction information of a transmission power decrease to the mobile terminal when the reception field strength value actually having been measured being higher than the expected reception field strength value, wherein the expected reception field strength value being set to a lower value than usual when having received the information of communication quality degradation of the forward channel from the forward channel transmission power controller.

The transmission power control apparatus according to the present invention also comprising:

(1) a communication quality judging part for verifying communication quality of the forward channel based on the forward channel frame error rate reported from the mobile terminal and judging a communication quality of the forward channel degradation when the forward channel frame error rate reported being worse than a predetermined threshold frame error rate for the forward channel with expecting no improvement, and for verifying communication quality of the reverse channel based on a reverse channel frame error rate calculated by detected received data errors and judging a communication quality of the reverse channel degradation when the reverse channel frame error rate calculated being worse than a predetermined threshold frame error rate for the reverse channel with continuing the same state for predetermined periods of timing; and (2) a transmission power control part for controlling the transmission power of the forward channel, based on the forward channel frame error rate reported, with setting a lower value than usual when having received information of a degraded communication quality of the reverse channel from the communication quality judging part, and controlling the transmission power of the reverse channel by providing instruction information of a transmission power increase to the mobile terminal when the reception field strength value actually having been measured being lower than an expected reception field strength value, based on the reverse channel frame error rate calculated, as the result of comparison, and providing instruction information of a transmission power decrease to the mobile terminal when the reception field strength value actually having been measured being higher than the expected reception field strength value, wherein the expected reception field strength value being set to a lower value than usual when having received information of communication quality degradation of the forward channel from the communication quality judging part.

The transmission power control apparatus according to the present invention also comprising:

(1) a forward channel transmission power controller for controlling a transmission power of the forward channel radio signals based on the forward channel frame error rate, obtained by a report from the mobile terminal, with setting a lower value than usual when having received information of a degraded communication quality of the reverse channel, judging communication quality of the forward channel based on the forward channel frame error rate, and outputting information of communication quality degradation of the forward channel when judging result indicating the forward channel frame error rate being worse than a predetermined threshold frame error rate of the forward channel and expecting no improvement; and (2) a reverse channel transmission power controller for comparing an expected reception field strength value, based on the reverse channel frame error rate calculated, with the reception field strength value of the reverse channel radio signals actually having been measured, and providing instruction information of a transmission power increase to the mobile terminal when the reception field strength value actually having been measured being lower than the expected reception field strength value, providing instruction information of a transmission power decrease to the mobile terminal when the reception field strength value actually having been measured being higher than the expected reception field strength value, wherein the expected reception field strength value being set to a lower value than usual when having received the information of communication quality degradation of the forward channel, judging communication quality of the reverse channel based on the reverse channel frame error rate calculated, and outputting information of communication quality degradation of the reverse channel when judging result indicating the reverse channel frame error rate being worse than a predetermined threshold frame error rate of the reverse channel and continuing the same state for predetermined periods of timing.

The transmission power control apparatus according to the present invention also comprising:

(1) a communication quality judging part for verifying communication quality of the forward channel based on the forward channel frame error rate reported from the mobile terminal and judging a communication quality of the forward channel degradation when the forward channel frame error rate reported being worse than a predetermined threshold frame error rate for the forward channel with expecting no improvement, and for verifying communication quality of the reverse channel based on a reverse channel frame error rate calculated by detected received data errors and judging a communication quality of the reverse channel degradation when the reverse channel frame error rate calculated being worse than a predetermined threshold frame error rate for the reverse channel with continuing the same state for predetermined periods of timing; and (2) a transmission power control part for controlling the transmission power of the forward channel, based on the forward channel frame error rate reported, with setting a lower value than usual when having received information of a degraded communication quality of the reverse channel, and when having received information of a degraded communication quality of the forward channel regardless of communication quality of the reverse channel, from the communication quality judging part, and controlling the transmission power of the reverse channel by providing instruction information of a transmission power increase to the mobile terminal when the reception field strength value actually having been measured being lower than an expected reception field strength value, based on the reverse channel frame error rate calculated, as the result of comparison, and providing instruction information of a transmission power decrease to the mobile terminal when the reception field strength value actually having been measured being higher than the expected reception field strength value, wherein the expected reception field strength value being set to a lower value than usual when having received information of communication quality degradation of the forward channel, and when having received information of communication quality degradation of the reverse channel regardless of communication quality of the forward channel, from the communication quality judging part.

The transmission power control apparatus according to the present invention also comprising:

(1) a forward channel transmission power controller for judging communication quality of the forward channel based on the forward channel frame error rate, outputting information of communication quality degradation of the forward channel when judging result indicating the forward channel frame error rate being worse than a predetermined threshold frame error rate of the forward channel and expecting no improvement, and controlling a transmission power of the forward channel radio signals based on the forward channel frame error rate, obtained by a report from the mobile terminal, with setting a lower value than usual when having received information of a degraded communication quality of the reverse channel, and when having judged communication quality of the forward channel being degraded regardless of communication quality of the reverse channel; and (2) a reverse channel transmission power controller for judging communication quality of the reverse channel based on the reverse channel frame error rate calculated, outputting information of communication quality degradation of the reverse channel when judging result indicating the reverse channel frame error rate being worse than a predetermined threshold frame error rate of the reverse channel and continuing the same state for predetermined periods of timing, comparing an expected reception field strength value, based on the reverse channel frame error rate calculated, with the reception field strength value of the reverse channel radio signals actually having been measured, providing instruction information of a transmission power increase to the mobile terminal when the reception field strength value actually having been measured being lower than the expected reception field strength value, and providing instruction information of a transmission power decrease to the mobile terminal when the reception field strength value actually having been measured being higher than the expected reception field strength value, wherein the expected reception field strength value being set to a lower value than usual when having received the information of communication quality degradation of the forward channel, and when having judged communication quality degradation of the reverse channel regardless of communication quality of the forward channel.

The transmission power control apparatus according to the present invention also comprising:

(1) a forward channel error rate judgment section for obtaining the forward channel frame error rate reported by the mobile terminal, judging communication quality of the forward channel based on the forward channel frame error rate obtained, and outputting the forward channel frame error rate and information of communication quality degradation of the forward channel when judging the forward channel frame error rate being worse than a predetermined threshold frame error rate of the forward channel and expecting no improvement;

(2) a reverse channel error rate judgment section for calculating a reverse channel frame error rate based on received data errors detected, judging communication quality of the reverse channel based on the reverse channel frame error rate calculated, outputting information of communication quality degradation of the reverse channel when judging result indicating the reverse channel frame error rate being worse than a predetermined threshold frame error rate of the reverse channel and continuing the same state for predetermined periods of timing, providing an expected reception field strength value based on the reverse channel frame error rate calculated, and outputting the expected reception field strength value with setting to a lower value than usual when having received the information of communication quality degradation of the forward channel from the forward channel error rate judgment section, and when having judged communication quality degradation of the reverse channel regardless of communication quality of the forward channel;

(3) a reception field strength judgment section for comparing the expected reception field strength value output from the reverse channel error rate judgment section with the reception field strength value of the reverse channel radio signals actually having been measured, and providing instruction information of a transmission power increase to the mobile terminal when the reception field strength value actually having been measured being lower than the expected reception field strength value and instruction information of a transmission power decrease to the mobile terminal when the reception field strength value actually having been measured being higher than the expected reception field strength value; and (4) an output power control section for controlling a transmission power of the forward channel radio signals based on the forward channel frame error rate output from the forward channel error rate judgment section with setting to a lower value than usual when having received information of communication degradation of the reverse channel, and when having received information of communication degradation of the forward channel regardless of communication quality of the reverse channel.

The transmission power control apparatus according to the present invention further comprising a moving speed measuring part for measuring moving speed of the mobile terminal being communicating and outputting one of moving speed information of a high speed mode or a normal speed mode; and wherein the communication quality of the forward channel judging part being provided with two types of predetermined threshold values, for the normal speed mode and for the high speed mode respectively, for judging a communication quality degradation of the forward channel.

The transmission power control apparatus according to the present invention also further comprising a subscriber priority judgment part for discriminating subscriber class of the mobile terminal being communicating and outputting one of subscriber class information of a priority class or an ordinary class; and wherein the communication quality of the forward channel judging part being provided with additional two types of predetermined threshold values, for the priority class and for the ordinary class respectively, for judging a communication quality degradation of the forward channel.

BRIEF DESCRIPTION OF THE DRAWINGS

FIG. 13 is a flow chart illustrating operations of transmission power controls of a radio base station in the prior art.

DETAILED DESCRIPTION OF PREFERRED EMBODIMENTS OF THE INVENTION

Referring to drawings, a constitution of a first embodiment of a transmission power control apparatus according to the present invention will be described.

Figure 1:
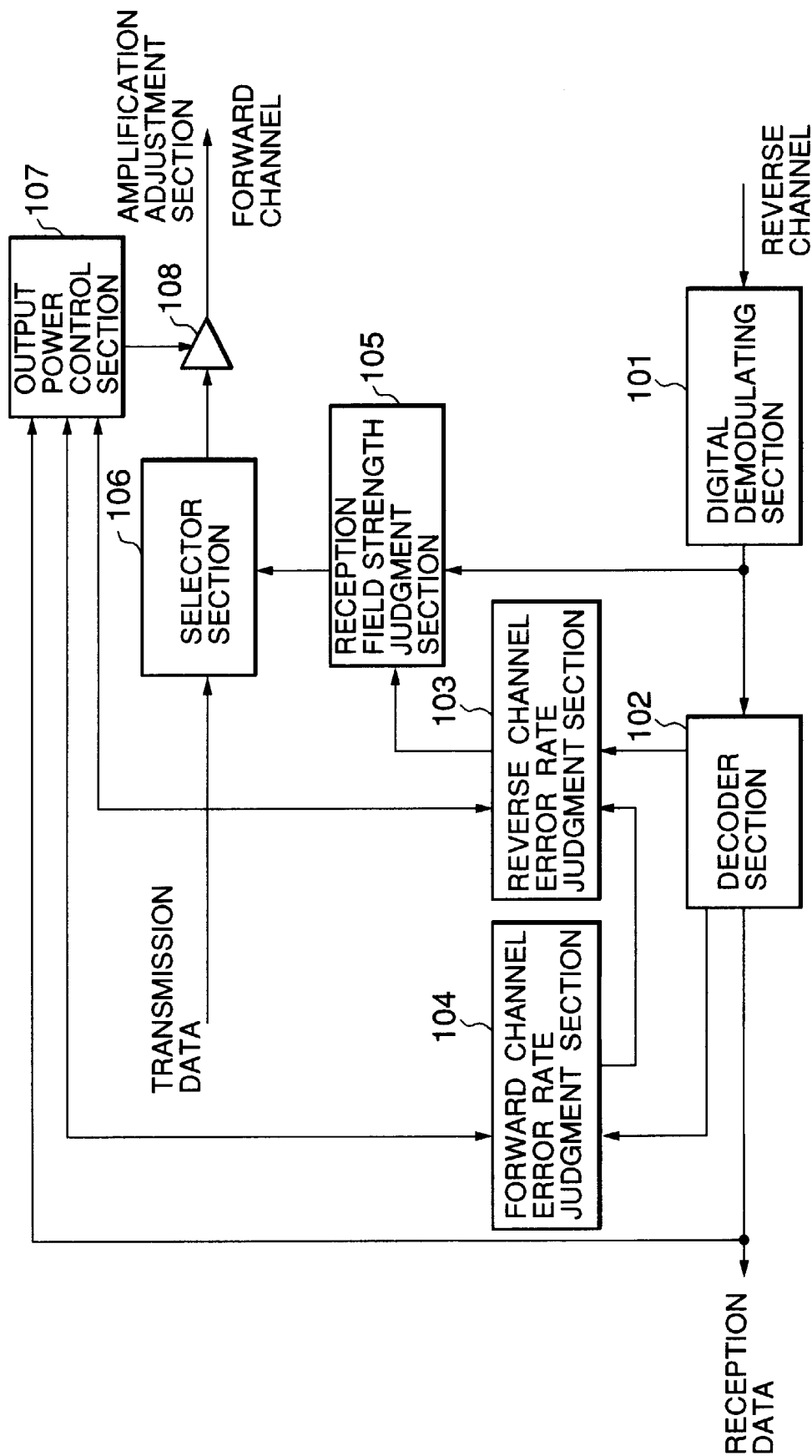
FIG. 1 is a block diagram illustrating a configuration of an embodiment of a transmission power control apparatus according to the present invention.
Figure 2:
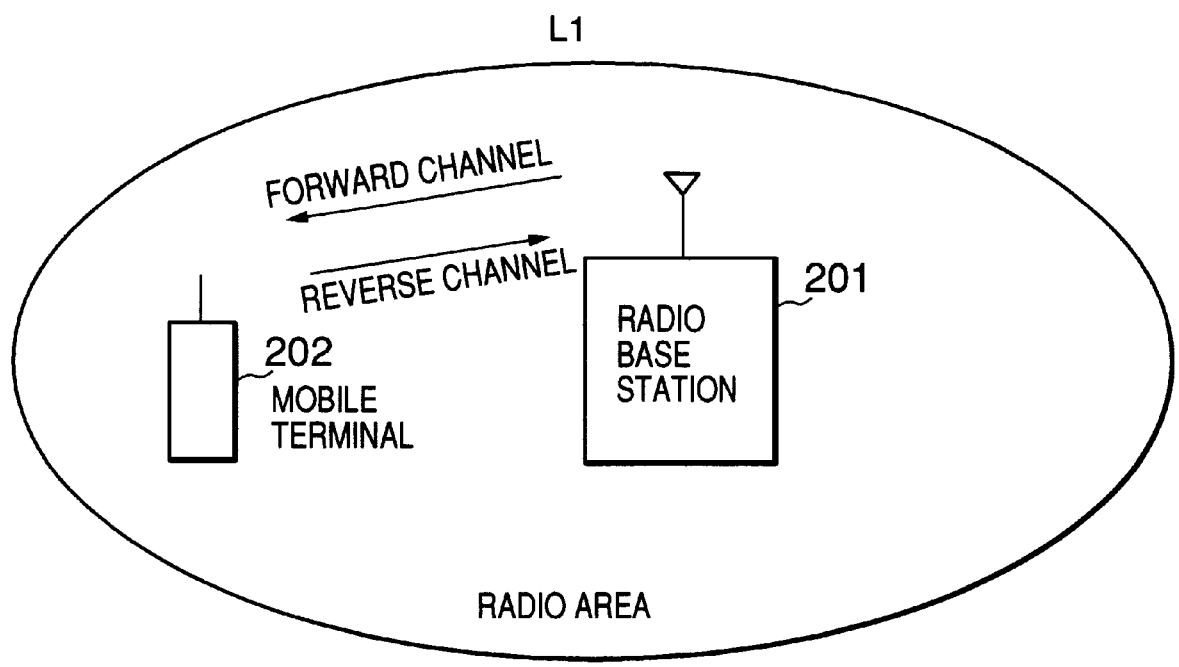
FIG. 2 is a system concept diagram illustrating a concept of a configuration in a radio area of a radio base station and a mobile terminal of the present invention.

Referring to FIG. 1, there is shown a block diagram illustrating a constitution of an apparatus in a radio base station of the transmission power control apparatus according to the present invention. Referring to FIG. 2, there is shown a system concept diagram illustrating a concept of a constitution in a radio area (cell) of a radio base station and a mobile terminal in the present invention, representing a condition that the radio base station 201 communicates with the mobile terminal 202 in the radio area L1 via radio signals by the CDMA system.

A mobile terminal 202 used in the mobile communication system basically includes a signal receiving and transmitting device for radio communication with the radio base station 201, i.e., receiving forward channel radio signals transmitted from the radio base station 201 and transmitting reverse channel radio signals to the base station 201, a forward channel error measuring device for measuring a frame error rate of the received forward channel radio signals and reporting the measuring result to the radio base station by reveres channel radio signals, and a reverse channel transmission power control device for controlling transmission power of reverse channel radio signals from the mobile terminal in accordance with instruction transmitted from the base station by forward channel radio signals.

The radio base station 201 basically includes a signal receiving and transmitting device for radio communication with the mobile terminal 202, i.e., receiving reverse channel radio signals transmitted from the mobile terminal 202 and transmitting forward channel radio signals to the mobile terminal 202, a reverse channel error detecting device for detecting received data errors of the reverse channel radio signals, and a reception field strength measuring device for measuring a reception field strength of the reverse channel radio signals.

In FIG. 1, the transmission power control apparatus of the radio base station has a constitution of a functional section as described below.

A digital demodulating section 101 digitizes received radio signals of the reverse channel from the mobile terminal and outputs digitized signals to a decoder section 102 described later. In addition, it measures a reception field strength of the receiving signal and then outputs the measured value to a reception field strength judgment section 105 described later.

The decoder section 105 performs a data error detection in a receiving signal digitized by the digital demodulating section 101, and outputs the result of detected errors to a reverse channel error rate judgment section 103 described later. It also extracts a frame error rate of forward channel radio signals which has been measured and reported by the mobile terminal, and outputs the result of extracted frame error rate to a forward channel error rate judgment section 104 described later.

A reverse channel error rate judgment section 103 collects data errors in receiving signals reported by the decoder section 102, and calculates a reverse channel frame error rate. At the same time, based on the calculated reverse channel frame error rate, the reverse channel error rate judgment section 103 calculates an expected reception field strength in the reverse channel, and outputs the result of calculation to the reception field strength judgment section 105 described later.

The forward channel error rate judgment section 104 performs a judgment processing of a frame error rate of forward channel radio signals reported through the decoder section 102, as set forth in the foregoing, and then reports the result of judgment to an output power control section 107 described later for transmission power control of the forward channel radio signals.

The reception field strength judgment section 105 has a function to determine which instruction, a transmission power increase or decrease, is to be transmitted to the mobile terminal for transmission power control of the reverse channel radio signals, based on the expected reception field strength of the reverse channel calculated by the reverse channel error rate judgment section 103 and reception field strength of the receiving signal actually measured by the digital demodulating section 101.

A selector section 106 piles up transmission data to be transmitted to the mobile terminal and the instruction data of transmission power alteration (increase or decrease) for the mobile terminal determined by the reception field strength judgment section 105, and then outputs the data signal to an amplification adjustment section 108 described later.

The output power control section 107 controls a transmission power of forward channel radio signals which the radio base station transmits.

The amplification adjustment section 108, which is controlled by the output power control section 107, performs an increase/decrease adjustment of signal power to be transmitted as the forward channel.

Next, referring to FIGS. 1, 3 and 4, an operation of the transmission power control apparatus in the radio base station, as configured above, will be described.

Figure 3:
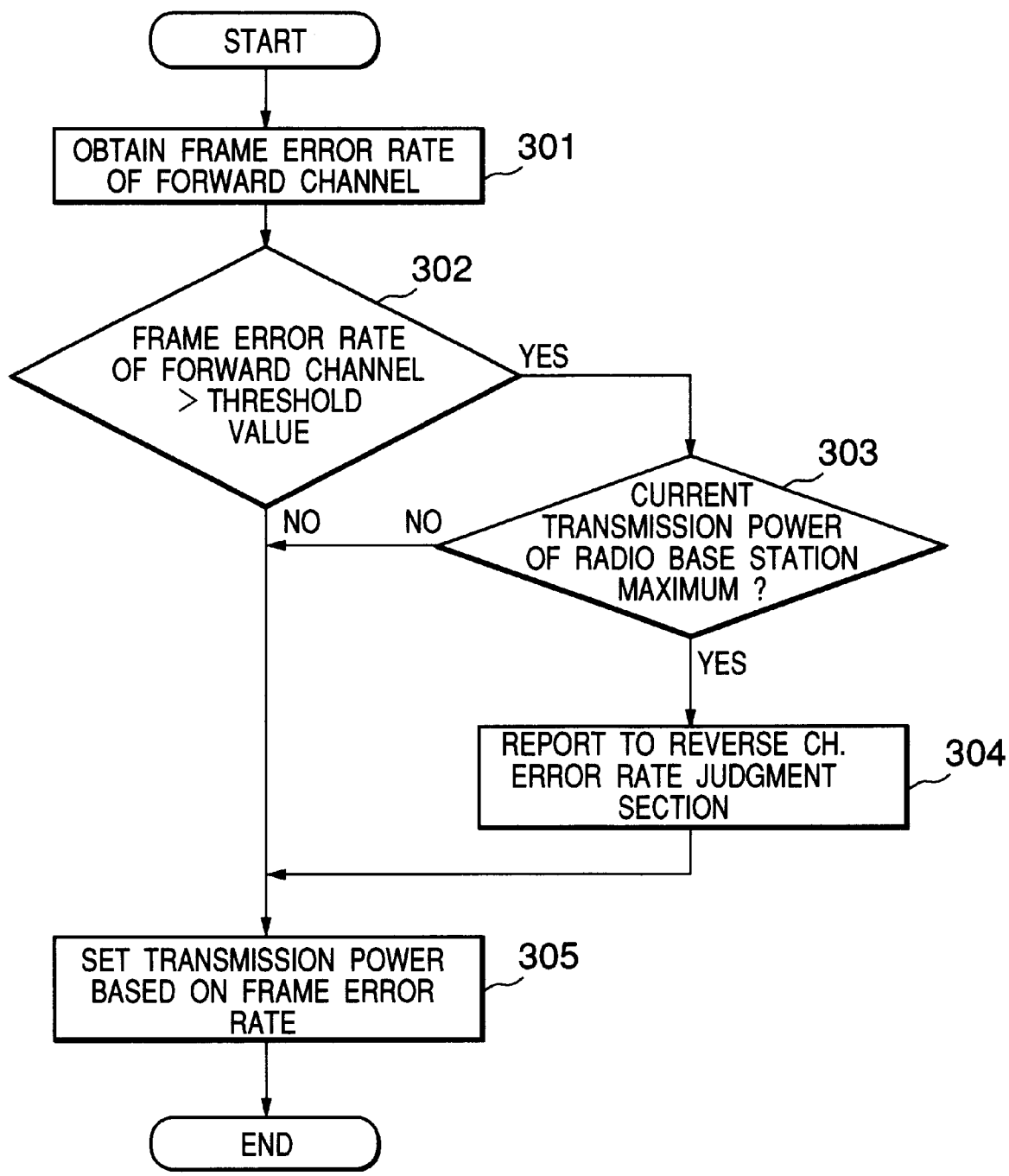
FIG. 3 is a flow chart illustrating operations of transmission power controls executed by a forward channel error rate judgment section and a output power control section in FIG. 1.

Referring to FIG. 3, there is shown a flow chart indicating an operation of transmission power control performed by the forward channel error rate judgment section 104 and the output power control section 107 in FIG. 1.

In the radio base station, a value of the worst frame error rate allowable for radio communication by the forward channel is predetermined and set in the forward channel error rate judgment section 104 as a threshold value. When controlling a transmission power of forward channel radio signals, the radio base station first extracts, in the decoder section 102, a forward channel frame error rate measured and reported by the mobile terminal, and then reports the value of extracted frame error rate to the forward channel error rate judgment section 104 (Step 301). The forward channel error rate judgment section 104 stores the reported forward channel frame error rate, which is then compared with the threshold value preset in the forward channel error rate judgment section 104 at an interval of a predetermined period (for example, 2 seconds) (Step 302). If, as the result, the value of reported frame error rate is exceeding the threshold, the forward channel error rate judgment section 104, then, confirms whether the current transmission power of the radio base station is the maximum or not (Step 303). If the current transmission power of the radio base station is the maximum, the forward channel error rate judgment section 104 judges that the frame error rate of the forward channel cannot be improved any more, thus reporting the result to the reverse channel error rate judgment section 103 indicating that communication quality of the forward channel being degraded (Step 304). After Steps 301 to 304 are completed, the forward channel error rate judgment section 104 reports the detected forward channel frame error rate to the output power control section 107, which then performs a transmission power alteration of the forward channel based on the reported forward channel frame error rate (Step 305). The radio base station transmits radio signals with a transmission power according to the value alternated by the output power control section 107.

In other words, if it has received a report that a frame error rate of the forward channel was unfavorable, the transmission power of the forward channel is to be increased for improvement; if it has received a report that a frame error rate was too favorable, the transmission power of the forward channel is to be decreased in order to reduce interference with other communication. Naturally, if a transmission power reaches the maximum value, the transmission power cannot be increased any more even if the frame error rate is unfavorable.

Figure 4:
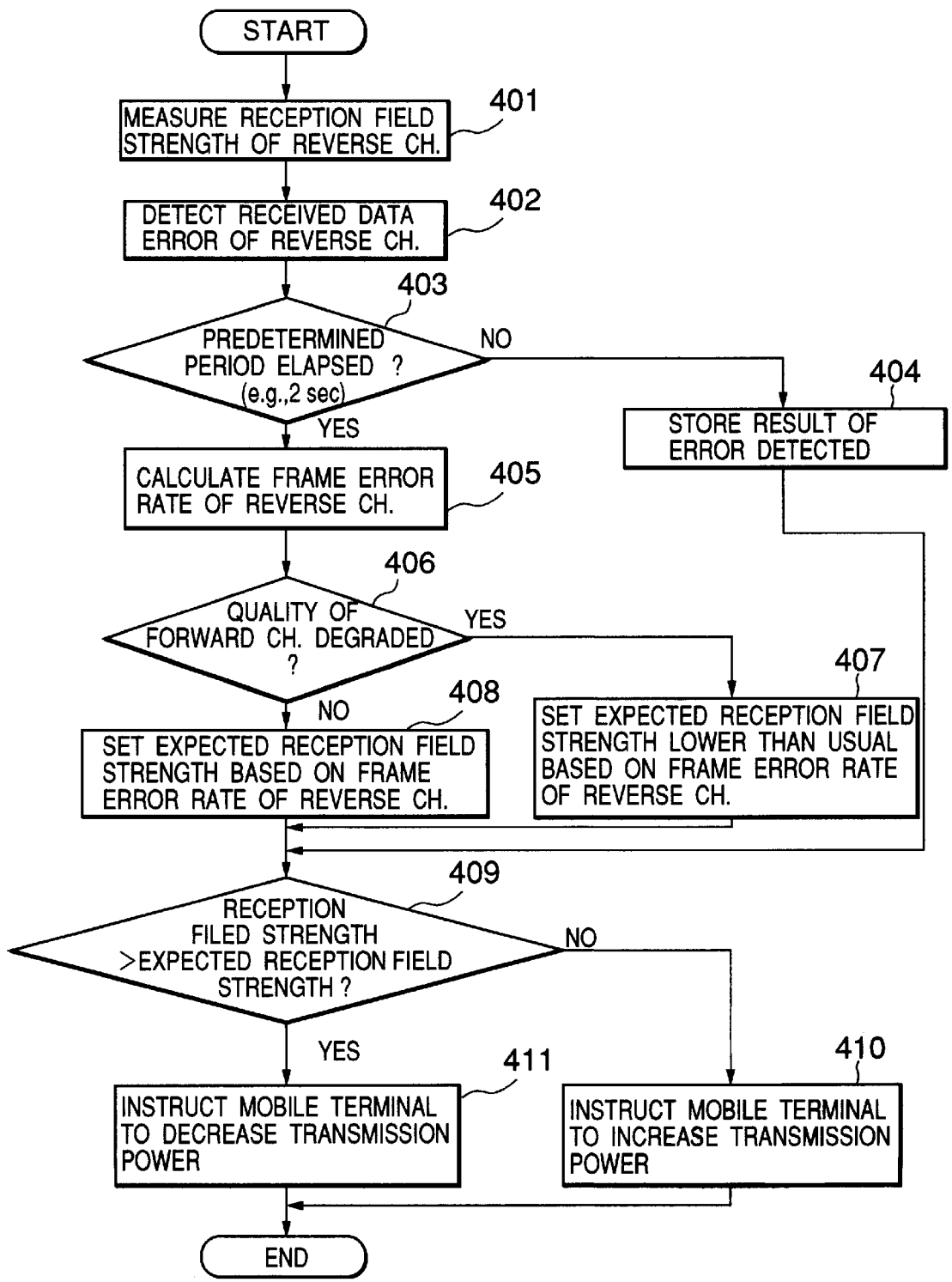
FIG. 4 is a flow chart illustrating operations of transmission power control for providing instructions to the mobile terminal executed by a reverse channel error rate judgment section and a reception field strength judgment section in FIG. 1.

Referring to FIG. 4, there is shown a flow chart indicating an operation of a transmission power control instruction of the reverse channel to be transmitted to the mobile terminal performed by the reverse channel error rate judgment section 103 and the reception field strength judgment section 105.

In order to control a transmission power of the reverse channel radio signals, the radio base station measures states of the reverse channel and gives necessary instructions to the mobile terminal taking other factors, which will be described later, into account for transmission power alteration.

The radio base station, by the digital demodulating section 101, measures the reception field strength of received radio signals from the mobile terminal, and then reports the measured result to the reception field strength judgment section 105 (Step 401). Among signals digitized by the digital demodulating section 101, an error detection is performed by the decoder section 102, and the error detection result is reported to the reverse channel error rate judgment section 103 (Step 402). The reverse channel error rate judgment section 103 stores the error detection result for a certain period (for example, 2 seconds), after which (Step 403), it calculates a frame error rate as the reverse channel frame error rate (Step 405). After calculating the reverse channel frame error rate, the reverse channel error rate judgment section 103 confirms whether there has been a report from the forward channel error rate judgment section 104 indicating that communication quality of the forward channel is being degraded, as described above (Step 406).

If no such a report has been received, the reverse channel error rate judgment section 103 provides an expected reception field strength of the reverse channel based on the calculated frame error rate of the reverse channel (Step 408). If the report has been received, the reverse channel error rate judgment section 103 alters the value of expected reception field strength of the reverse channel to lower value than a normal one which was supposed to be provided based on the calculated frame error rate (Step 407).

The expected reception field strength, provided by the reverse channel error rate judgment section 103, is reported to the reception field strength judgment section 105 as a target value of the reception field strength for judging communication quality of the reverse channel. The reception field strength judgment section 105 compares the reception field strength of the reverse channel radio signals, actually measured by the digital demodulating section 101, with the expected reception field strength, provided by the reverse channel error rate judgment section 103 (Step 409). If the reception field strength actually measured is lower than the expected reception field strength, the reception field strength judgment section 105 judges that communication quality of the reverse channel is degraded and it is necessary to instruct a transmission power increase to the mobile terminal (Step 410) for improving communication quality of the reverse channel. On the other hand, if the reception field strength actually measured is higher than the expected reception field strength, it judges that communication quality of the reverse channel is too favorable and it is necessary to instruct a transmission power decrease to the mobile terminal for avoiding other communications from being radio interfered (Step 411).

The reception field strength judgment section 105, then, outputs the transmission power alteration instruction (power increase or power decrease) to the mobile terminal to the selector section 106. The selector section 106 piles up the instruction to transmission data for the mobile terminal, and outputs radio signals as the forward channel, thus reporting it to the mobile terminal.

In the above control operations, when it is apparent that the forward channel frame error rate is no longer improved and communication quality of the forward channel is degraded, a lower value of the expected reception field strength is provided than the normal case; therefore reception field strength actually measured tends to exceeds the expected reception field strength, and then the instruction of transmission power alteration tends to move to a decreasing direction. As a result, the transmission power of the mobile terminal becomes smaller than the normal one.

In addition, in the operation of providing the expected reception field strength, it may also be possible to confirm communication quality of the forward channel after the expected reception field strength is determined beforehand and then modifying the value of the expected reception field strength according to the confirmed result.

Thus, in the first embodiment of the present invention, it is possible to perform the transmission power control for avoiding as much interference with other communications as possible by not increasing a power of radio signals of the reverse channel if it is judged that a degraded communication quality in the forward channel stays unimproved.

Figure 5:
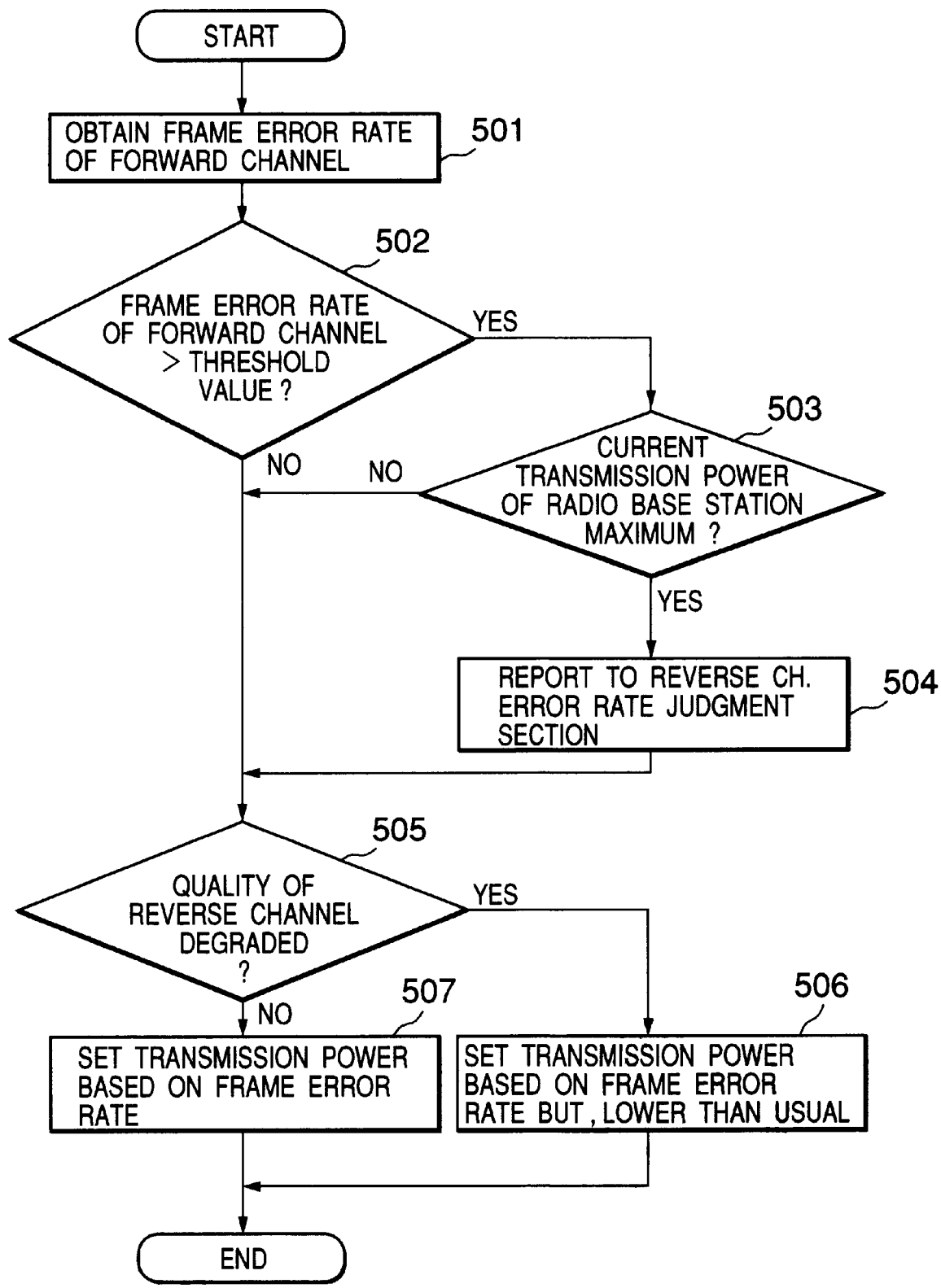
FIG. 5 is a flow chart illustrating operations of transmission power controls in a second embodiment executed by the forward channel error rate judgment section and the output power control section in FIG. 1.
Figure 6:
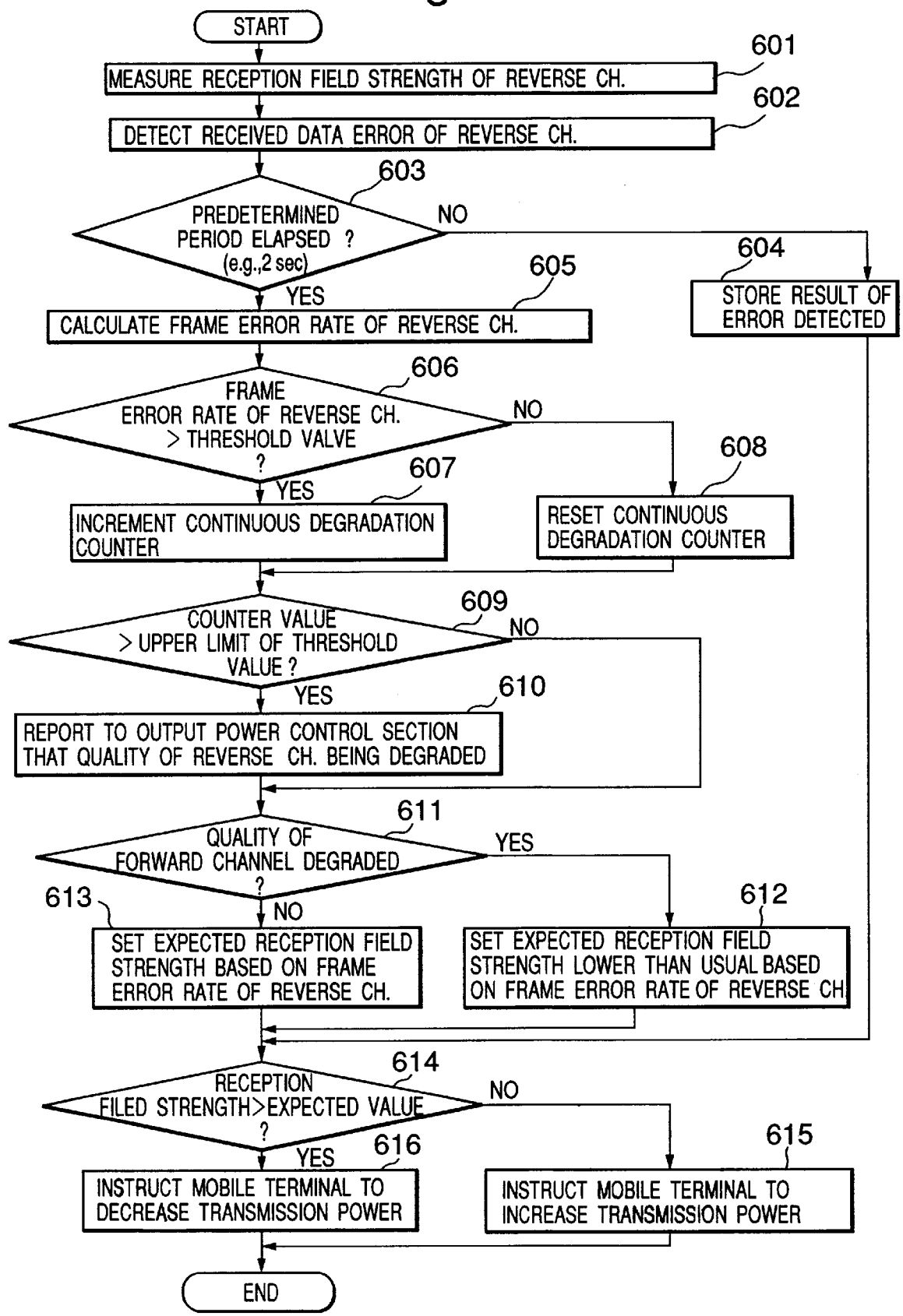
FIG. 6 is a flow chart illustrating operations of transmission power control for providing instructions to a mobile terminal in the second embodiment executed by the reverse channel error rate judgment section and the reception field strength judgment section in FIG. 1.

Next, referring to FIGS. 1, 5 and 6, a second embodiment of a transmission power control apparatus according to the present invention will be described.

The configuration of the apparatus in the radio base station is the same as that of the first embodiment, which is shown in FIG. 1. Referring to FIGS. 5 and 6, there are shown flow charts of operations of the second embodiment; FIG. 5 shows an operation related to a transmission power control of the forward channel radio signals transmitted by a radio base station, and FIG. 6 shows an operation related to a transmission power control of the reverse channel radio signals transmitted by a mobile terminal, which is instructed from the radio base station to the mobile terminal.

First, referring to FIG. 5, an explanation will be made below for a transmission power control of the radio signals in a forward channel which are transmitted by the radio base station.

In the radio base station, the forward channel error rate judgment section 104 has the predetermined worst frame error rate allowable for communication as the threshold value of the forward channel frame error rate.

When controlling a transmission power of forward channel radio signals transmitted from the radio base station to the mobile terminal, the radio base station first extracts, in the decoder section 102, a forward channel frame error rate measured and reported by the mobile terminal, and then reports the result value to the forward channel error rate judgment section 104 (Step 501).

The forward channel error rate judgment section 104 stores the reported frame error rate, which is then compared with the threshold value which is the worst frame error rate allowable for communication at an interval of a predetermined period (for example, 2 seconds) (Step 502).

If, as a result, the reported frame error rate value exceeds the threshold value, the forward channel error rate judgment section 104 confirms whether the radio base station is currently transmitting radio signals in the maximum power or not (Step 503). If the radio base station is transmitting in the maximum power, the forward channel error rate judgment section 104 judges that the forward channel frame error rate cannot be improved any more, thus reporting the result, that communication quality of the forward channel is degraded, to the reverse channel error rate judgment section 103 (Step 504).

After Steps 501 to 504 are completed, the forward channel error rate judgment section 104 reports the extracted forward channel frame error rate to the output power control section 107.

The output power control section 107 then determines a transmission power of the radio base station, based on the forward channel frame error rate reported by the forward channel error rate judgment section 104, and, at the same time, confirms whether the reverse channel error rate judgment section 103 has reported, as described later, that communication quality of the reverse channel is degraded and cannot be improved (Step 505). If the output power control section 107 has not received such a report, it determines a transmission power only based on the forward channel frame error rate as the normal way (Step 507). However, if it has received the report, the output power control section 107 determines that a value of transmission power is to be lower than usual value which is determined only by the forward channel frame error rate (Step 506).

Then, the amplification adjustment section 108 adjusts the amplification of radio signals transmitted from the radio base station according to the value determined as described above.

The above control operations may also be performed by determining a transmission power value first, and then confirming whether degraded communication quality of the reverse channel cannot be improved or not. And, if it is confirmed that degraded communication quality of the reverse channel cannot be improved, the value of transmission power is to be modified to a lower value than usual.

Next, referring to FIG. 6, an operation related to a transmission power control to be instructed to the mobile terminal will be described.

The reverse channel error rate judgment section 103 in the radio base station has the predetermined worst frame error rate allowable for communication as the threshold value of a reverse channel frame error rate and a continuous degradation counter with an upper threshold of the counter value.

The radio base station, in the same manner as for the first embodiment, performs an error detection in received radio signals from the mobile terminal by the decoder section 102, and the result of the error detection is reported to the reverse channel error rate judgment section 103. The reverse channel error rate judgment section 103 calculates a reverse channel frame error rate after a predetermined period of timing (for example, 2 seconds) (Step 601 to 605).

Next, the reverse channel error rate judgment section 103 compares the calculated reverse channel frame error rate with the threshold value of the reverse channel frame error rate (Step 606), and, if the reverse channel frame error rate value exceeds the threshold, the continuous degradation counter is incremented (Step 607). Otherwise, the reverse channel error rate judgment section 103 resets the continuous degradation counter to zero (Step 608). Then, after setting the continuous degradation counter, the reverse channel error rate judgment section 103 compares the counter value with the preset upper threshold of the continuous degradation counter (Step 609). If the value of the continuous degradation counter exceeds the upper limit of the threshold value of the continuous degradation counter, the reverse channel error rate judgment section 103 judges that communication quality of the reverse channel is being degraded and cannot be improved, and then reports the judgment to the output power control section 107 (Step 610).

Subsequently, the reverse channel error rate judgment section 103 confirms whether it has received, from the forward channel error rate judgment section 104, the report of quality degradation of the forward channel as described above (Step 611).

If the report has not been received, the reverse channel error rate judgment section 103 determines an expected reception field strength, as a target value of reception field strength for judging communication quality of the reverse channel, based on the reverse channel frame error rate (Step 613). If the report has been received, the reverse channel error rate judgment section 103 alters the value of the expected reception field strength to be determined based on the reverse channel frame error rate to a lower value than the normal one (Step 612).

The expected reception field strength determined by the reverse channel error rate judgment section 103 is provided to the reception field strength judgment section 105. The reception field strength judgment section 105 compares the reception field strength of the reverse channel radio signals, actually measure and reported by the digital demodulating section 101, with the expected reception field strength, which is provided by the reverse channel error rate judgment section 103 as the target value for judging communication quality of the reverse channel (Step 614).

If the reception field strength actually measured is lower than the expected reception field strength, the reception field strength judgment section 105 determines to instruct a transmission power increase to the mobile terminal (Step 615), as communication quality of the reverse channel is judged not being favorable and to be improved. If the reception field strength actually measured is higher than the expected reception field strength, it determines to instruct a transmission power decrease to the mobile terminal as communication quality of the reverse channel is too favorable and radio interferences to other communications are to be avoided (Step 611).

The reception field strength judgment section 105 reports to the selector section 106 an instruction of a transmission power increase or decrease to the mobile terminal, which has been determined in Step 615 or 616. Then the selector section 106 piles up transmission data and the reported transmission power increase/decrease instruction to the mobile terminal, and outputs as a signal of a forward channel, thus reporting it to the mobile terminal.

In the above control operations, when it is apparent that communication quality of the forward channel frame is no longer improved, a lower value of the expected reception field strength is provided than the normal case; therefore reception field strength actually measured tends to exceeds the expected reception field strength, and then the instruction of transmission power alteration tends to move to a decreasing direction. As a result, the transmission power of the mobile terminal becomes smaller than the normal one.

Thus, in the second embodiment of the present invention, it is possible to perform the transmission power control for avoiding as much interference with other communications as possible by not increasing a power of radio signals of own direction of channel if it is judged that a degraded communication quality in the other direction of channel stays unimproved.

Figure 7:
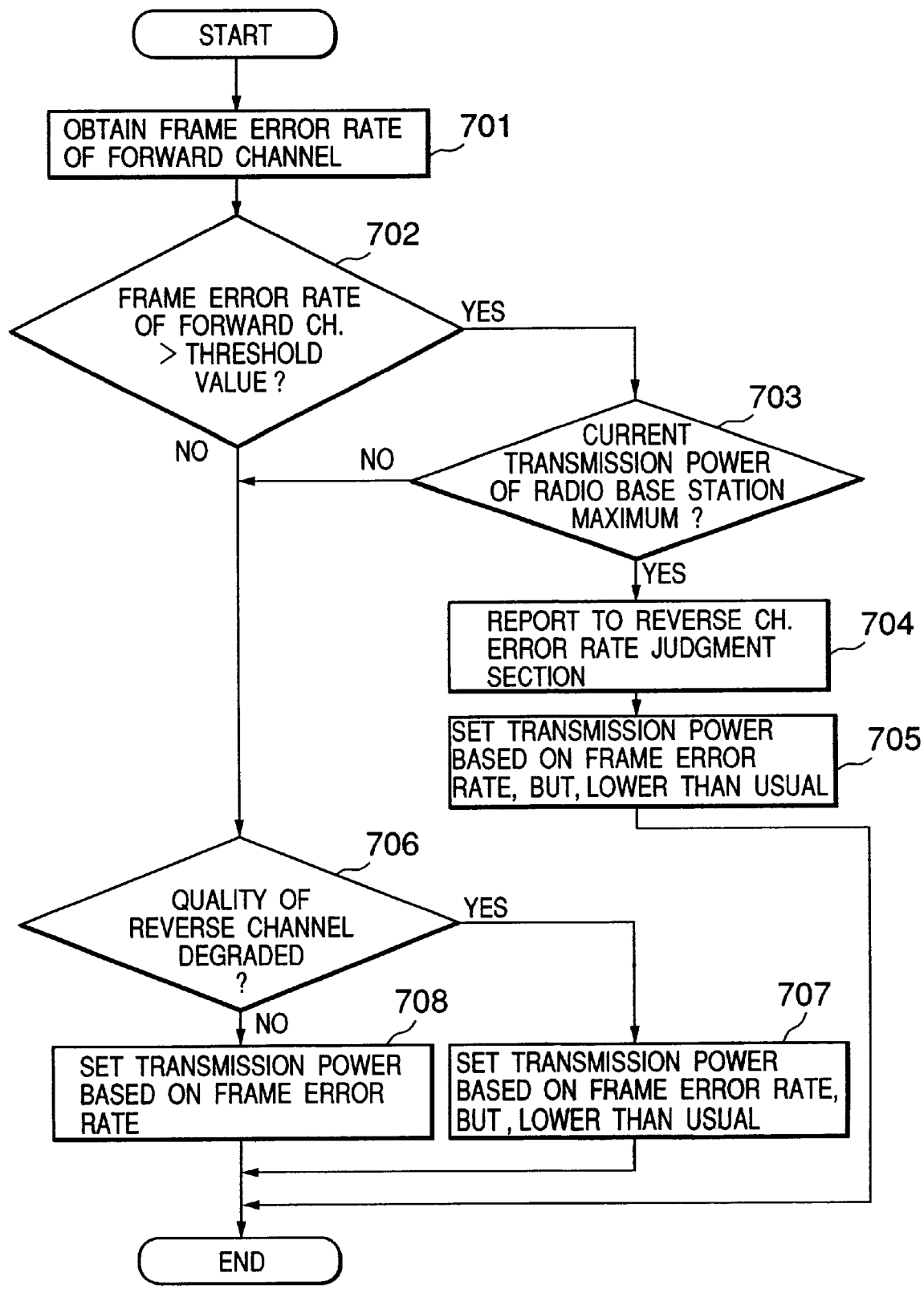
FIG. 7 is a flow chart illustrating operations of transmission power controls in a third embodiment executed by the forward channel error rate judgment section and the output power control section in FIG. 1.
Figure 8:
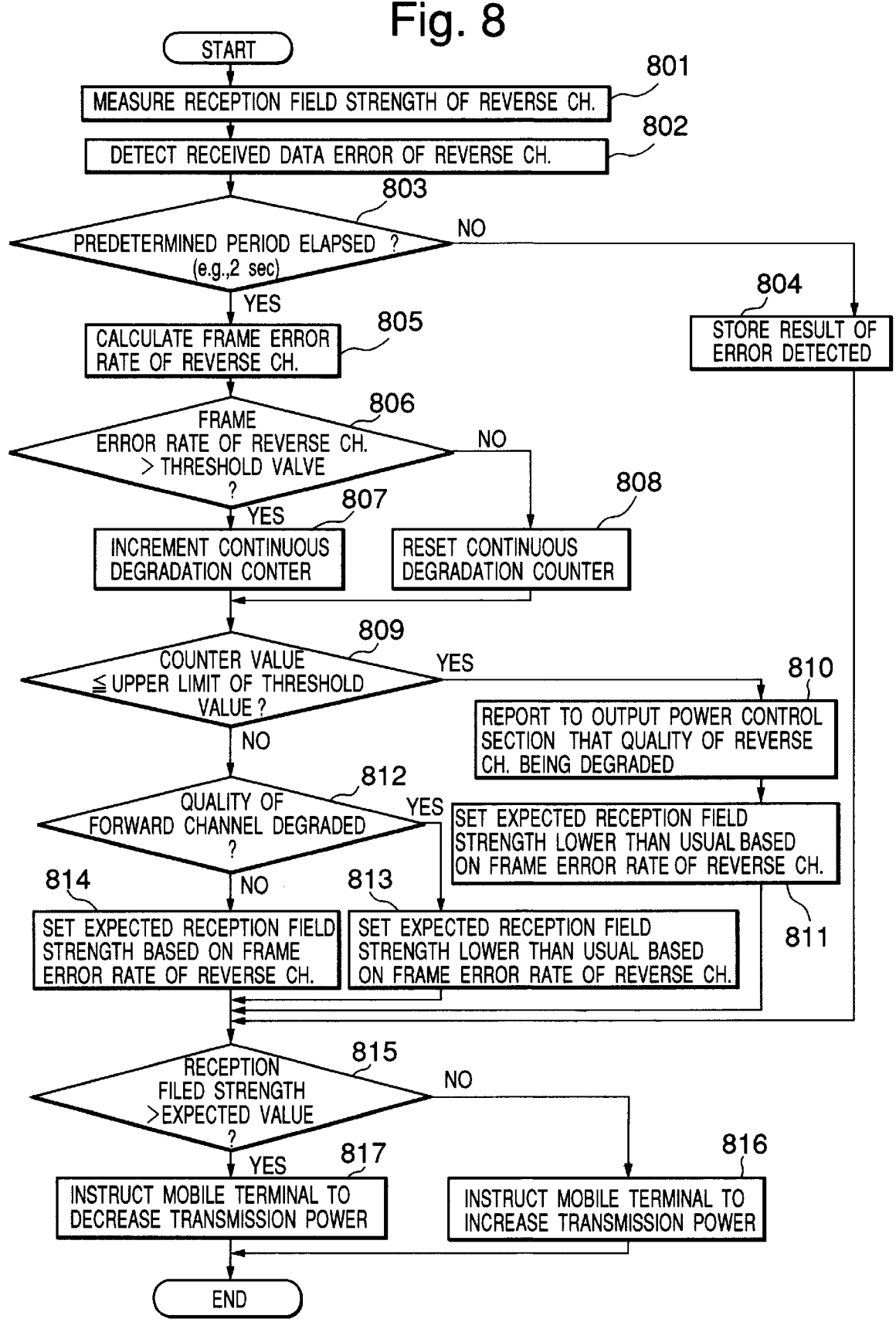
FIG. 8 is a flow chart illustrating operations of transmission power control for providing instructions to a mobile terminal in the third embodiment executed by the reverse channel error rate judgment section and the reception field strength judgment section in FIG. 1.

Subsequently, a third embodiment of a transmission power control apparatus according to the present invention will be described with reference to FIGS. 1, 7 and 8.

The configuration of the apparatus in a radio base station is the same as for the first embodiment. Therefore, for information about the configuration, refer to FIG. 1. FIGS. 7 and 8 are flow charts illustrating operations of the third embodiment, covering an operation related to the transmission power control of radio signals in the forward channel and the reverse channel respectively.

First, referring to FIG. 7, an explanation will be made for the transmission power control of radio signals in the forward channel transmitted by the radio base station.

A forward channel error rate judgment section 104 in the radio base station, in the same manner as for the transmission power control described in the first embodiment, compares a forward channel frame error rate extracted by a decoder section 102 with a predetermined threshold value which is the worst frame error rate allowable for communication in the forward channel (Steps 701 and 702).

If, as the result, the value of the forward channel frame error rate exceeds the threshold value, the forward channel error rate judgment section 104 confirms whether the current transmission power of the radio base station is the maximum output or not (Step 703).

If the current transmission power is the maximum output, the forward channel error rate judgment section 104 judges that the frame error rate in the forward channel cannot be improved any more, thus reporting the result, communication quality of the forward channel is degraded, to the reverse channel error rate judgment section 103 (Step 704). In this case, To the output power control section 107, the forward channel error rate judgment section 104 reports that a value of the transmission power should be set to a value lower than a normal one which is determined based on the forward channel frame error rate whether or not a report has been received that the quality of the reverse channel being degraded. The output power control section 107 sets the transmission power to a value lower than the normal one according to the specification (Step 705) and then transmits radio signals of the forward channel from the radio base station.

If the current transmission power is not the maximum output, the forward channel error rate judgment section 104 reports it and the forward channel frame error rate to the output power control section 107. The output power control section 107 sets a transmission power of the radio base station based on the forward channel frame error rate reported by the forward channel error rate judgment section 104; at this point, the output power control section 107 confirms whether it has received a report from the reverse channel error rate judgment section 103, as described later, that the degraded reverse channel frame error rate cannot be improved (Step 706). The output power control section 107, if it has not received, sets a transmission power based on the forward channel frame error rate (Step 708). The output power control section 107, if it has received, specifies a value lower than a normal one when setting a transmission power, based on the forward channel frame error rate (Step 707).

Subsequently, referring to FIG. 8, an operation related to a transmission power control for the mobile terminal will be described.

In the same manner as the transmission power control for the mobile terminal in the radio base station described in the second embodiment, the reverse channel error rate judgment section 103 of the radio base station has a predetermined value of the worst frame error rate, which is allowable for communication in the reverse channel, as the threshold value and a continuous degradation counter with its threshold of the counter value indicating that reverse channel being degraded.

The reverse channel error rate judgment section 103 calculates an reverse channel frame error rate after a predetermined period (for example, 2 seconds) and compares it with the threshold value of the reverse channel frame error rate. If the comparison result of the frame error rate is worse than the threshold value, the continuous degradation counter is incremented, on the other hand, if the comparison result is better than the threshold value, the continuous degradation counter is reset to zero so as to judge later whether the degradation of frame error rate detected is just a temporary state or continuing state (Steps 801 to 808).

Then, the value of the continuous degradation counter is compared with the threshold value of the continuous degradation counter which is the limit value for indicating that the quality of the reverse channel is being degraded (Step 809). The reverse channel error rate judgment section 103 judges that the reverse channel frame error rate cannot be improved if the continuous degradation counter value exceeds the threshold value of the continuous degradation counter and reports it to the output power control section 107 (Step 810), and then sets a expected reception field strength to a value lower than a normal one regardless of a report that the quality of the forward channel is degraded (Step 811).

Subsequently, the reverse channel error rate judgment section 103 confirms whether it has received, from the forward channel error rate judgment section 104, the report that the forward channel is degraded or not as described above (Step 812).

If the report has not been received, the reverse channel error rate judgment section 103 sets the expected reception field strength based on the reverse channel frame error rate (Step 814). If the report has been received, the reverse channel error rate judgment section 103 sets the expected reception field strength based on the reverse channel frame error rate to a value lower than the normal one (Step 813).

After setting the expected reception field strength, the reverse channel error rate judgment section 103 reports the expected reception field strength to the reception field strength judgment section 105. The reception field strength judgment section 105 compares the reception field strength of the reverse channel radio signals, which is reported by the digital demodulating section 101, with the expected reception field strength, which is reported by the reverse channel error rate judgment section 103 (Step 815).

As the result of comparison, if the reception field strength is lower than the expected reception field strength, the reception field strength judgment section 105 determines to specify a transmission power increase for the mobile terminal (Step 816), and if the reception field strength is higher than the expected reception field strength, it determines to specify a transmission power decrease for the mobile terminal (Step 817). The reception field strength judgment section 105 reports to the selector section 106 an increase/decrease instruction of a transmission power to the mobile terminal, which is determined in Step 816 or 817.

Then the selector section 106 piles up transmission data and the reported transmission power increase/decrease instruction to the mobile terminal, and outputs as a signal of the forward channel, thus reporting it to the mobile terminal.

Thus, in the third embodiment of the present invention, the communication quality of each of directions of the forward channel and the reverse channel are judged respectively, and then if it is judged that the degraded communication quality in the own channel (the forward channel or the reverse channel) stays unimproved, it is possible to perform a control for avoiding as much interference with other communications as possible by decreasing transmission power of radio signals of the own channel (the forward channel or the reverse channel) regardless of a degradation state of a communication quality of other channel (the reverse channel or the forward channel).

Next, referring to FIG. 9, a fourth embodiment of a transmission power control apparatus according to the present invention will be described.

Figure 9:
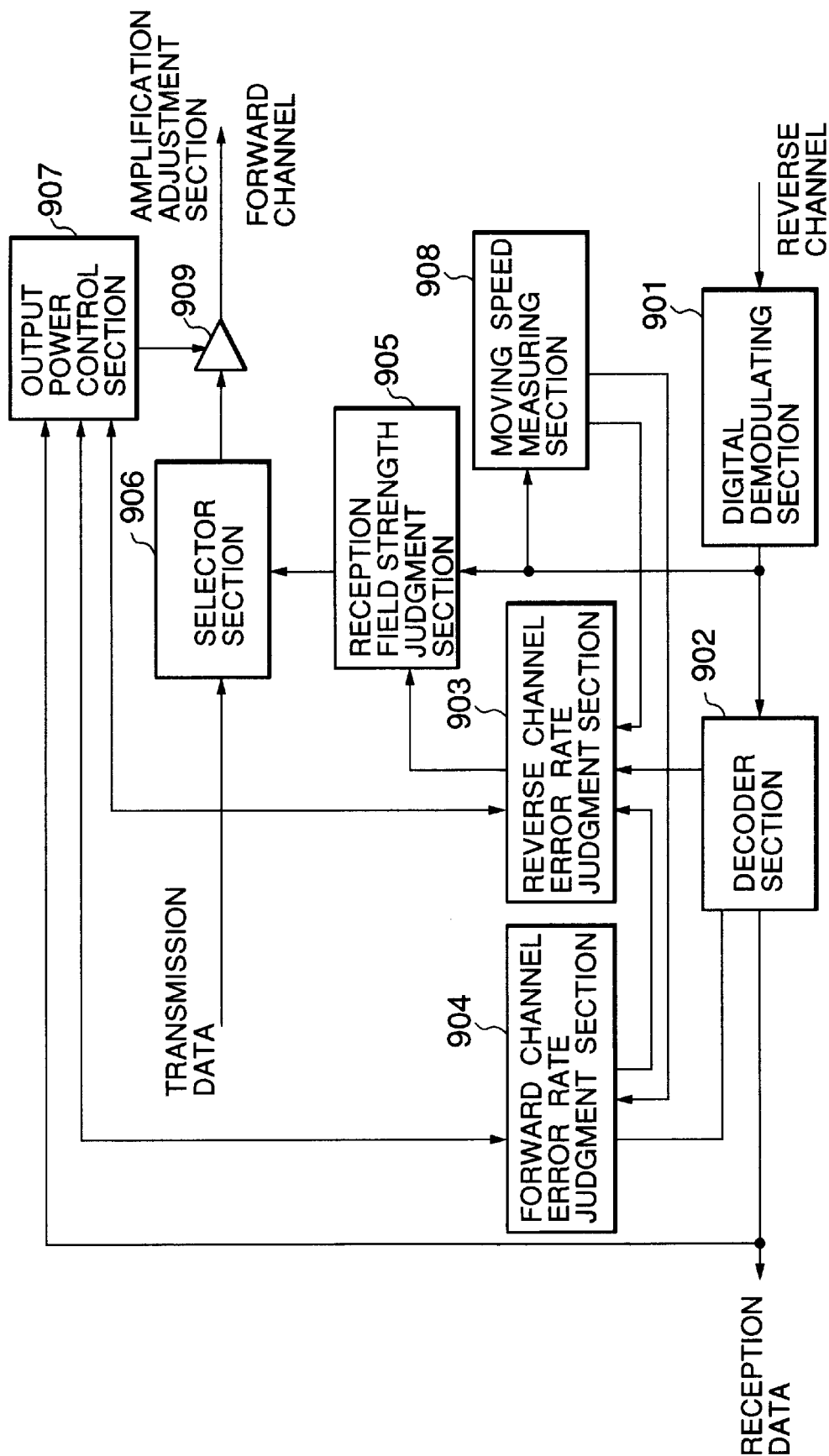
FIG. 9 is a block diagram illustrating a configuration of a fourth embodiment of a transmission power control apparatus according to the present invention.

Referring to FIG. 9, there is shown a block diagram illustrating a constitution of a transmission power control apparatus in a radio base station, in which a digital demodulating section 901, a decoder section 902, a reverse channel error rate judgment section 903, a forward channel error rate judgment section 904, a reception field strength measuring section 905, a selector section 906, a output power control section 907, and an amplification adjustment section 909 have the similar functions respectively as functional blocks of the configuration shown in FIG. 1 except for later-described points.

In the configuration of this embodiment, there is provided a moving speed measuring section 908, which has functions of measuring a time transition of a reception field strength received from a mobile terminal, of estimating a speed of the mobile terminal by extracting characteristic speed factors, and of classifying mobile terminals under communication into two moving modes, a high-speed moving mode and a normal-speed moving mode, so as to output the information.

The reverse channel error rate judgment section 903 of the radio base station has a predetermined value of the worst frame error rate, which is allowable for communication in the reverse channel, as the threshold value and a continuous degradation counter with its threshold of the counter value indicating that reverse channel being degraded, for the normal-speed moving mode and for the high-speed moving mode respectively. The forward channel error rate judgment section 904 has a predetermined value of the worst frame error rate, which is allowable for communication in the forward channel, as the threshold value for the normal-speed moving mode and for the high-speed moving mode respectively.

It is a measure taken for such a case that a degradation of communication quality of radio signals is sometimes effected by the geographical features such as a mountainous area, a plain area of country side or a city area, etc. If the mobile terminal is moving at a high speed, it is anticipated that the mobile terminal stays in the same area just temporarily, and therefore even if a degradation of the communication quality is detected at that point, there is a lot of possibilities that it returns to a previous normal quality level after passing through such area. From this point of view, it is not preferable to degrade a quality of a channel in the other direction as described above with judging it uniformly to be a degradation of a communication quality.

Accordingly, although a transmission power control is performed in the method as described above in the normal-speed moving mode, a threshold for a judgment of a quality degradation is set to a relatively high level with the control operations as described above for a mobile terminal in the high-speed moving mode, so that such a state that is judged to be a quality degradation in the normal-speed mode is not judged to be a quality degradation in the high-speed moving mode.

Instead, it is possible to apply a method of changing a calculation period of an error rate with the same threshold in both modes, for example a calculation period of an error rate for the high-speed moving mode is set to longer period than the normal-speed mode so as to prevent a communication quality from being judged to be degraded immediately after a deterioration of an error rate actually occurs.

In this manner, there are provided two types of judgment means, the normal-speed moving mode and the high-speed moving mode, for the reverse channel error rate judgment section 903 and the forward channel error rate judgment section 904.

The radio base station discriminates between the high-speed moving mode and the normal-speed moving mode of mobile terminals in the moving-speed judgment section 908 during communication with the mobile terminals, and then reports the information to both the reverse channel error rate judgment section 903 and the forward channel error rate judgment section 904. Also, when a change of the moving mode of a mobile terminal is detected from the normal-speed moving mode to the high-speed moving mode or from the high-speed moving mode to the normal-speed moving mode, the moving speed judgment section 908 reports the moving mode change information of the mobile terminal to both the reverse channel error rate judgment section 903 and the forward channel error rate judgment section 904. Each of the reverse channel error rate judgment section 903 and the forward channel error rate judgment section 904 judge a communication quality in a manner corresponding to each moving mode reported by the moving speed judgment section 908. On the basis of the judgment, a transmission power control is performed.

Figure 10:
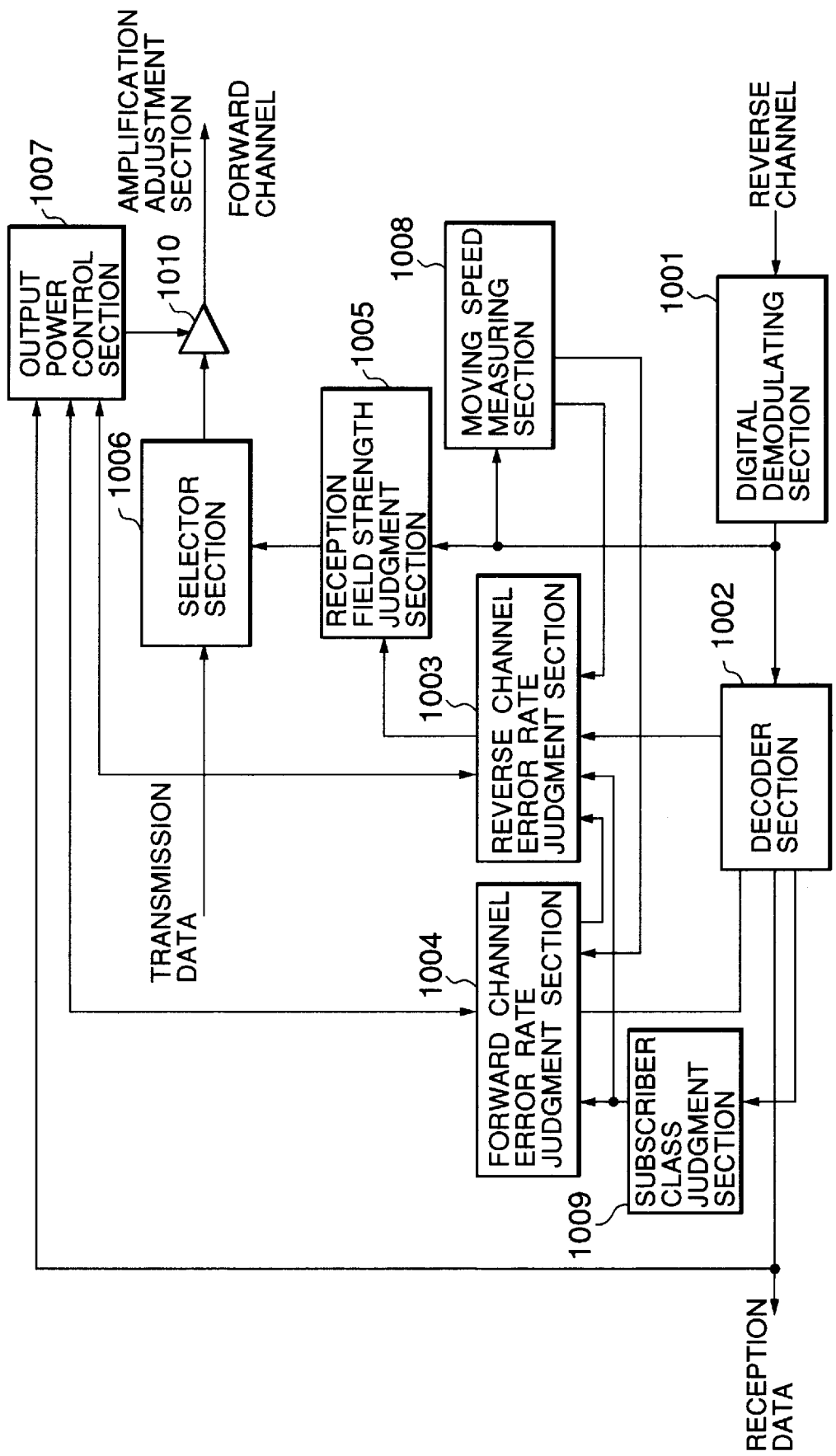
FIG. 10 is a block diagram illustrating a configuration of a fifth embodiment of a transmission power control apparatus according to the present invention.
Figure 11:
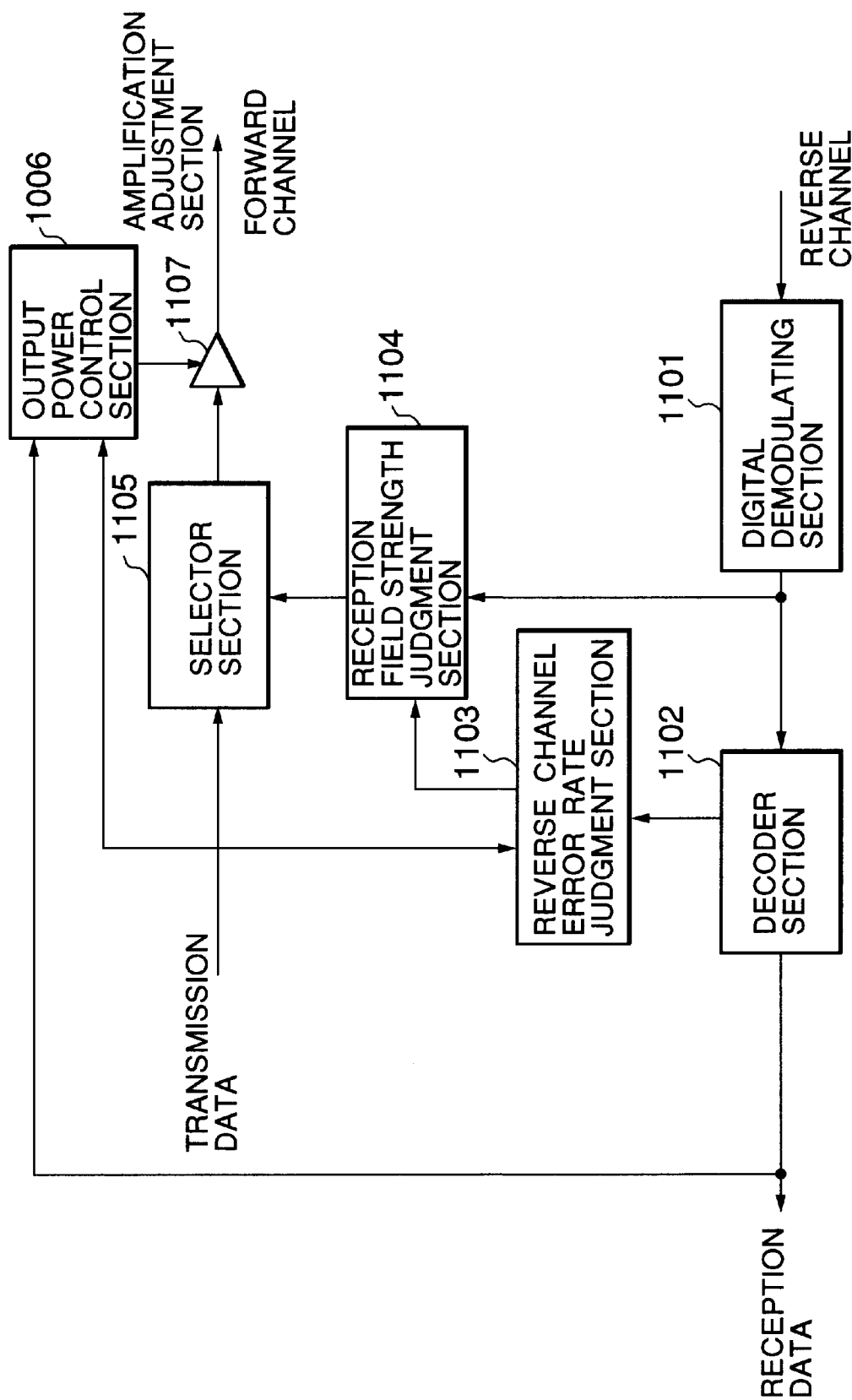
FIG. 11 is a block diagram illustrating a configuration of a transmission power control apparatus in a prior art.
Figure 12:
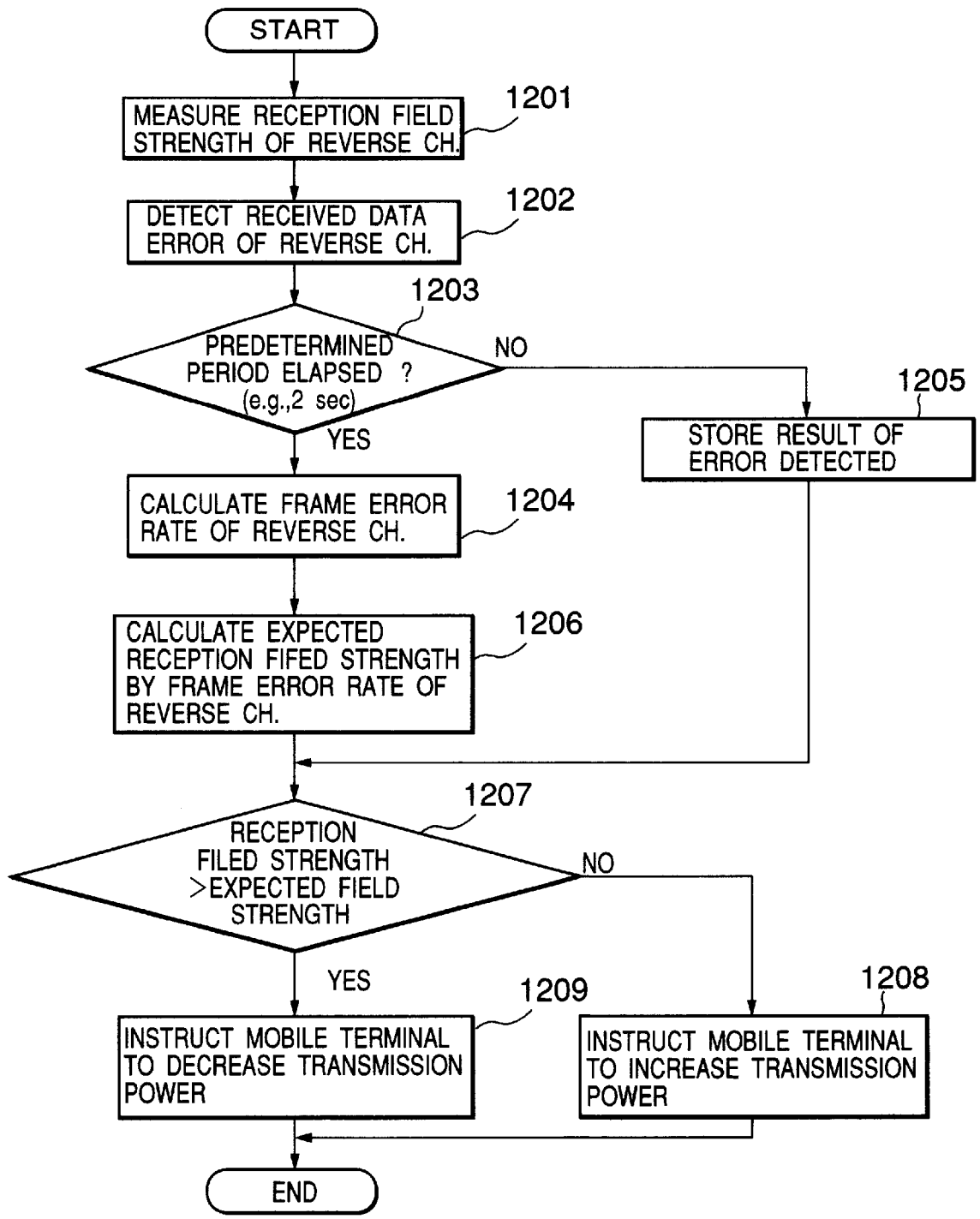
FIG. 12 is a flow chart illustrating operations of transmission power control for providing instructions to a mobile terminal in the prior art.

FIG. 10 is a block diagram illustrating a fifth embodiment of the present invention; a subscriber class judgment section 1009 is added to the configuration in FIG. 9.

In FIG. 10, a digital demodulating section 1001, a decoder section 1002, a reverse channel error rate judgment section 1003, a forward channel error rate judgment section 1004, a reception field strength judgment section 1005, a selector section 1006, a output power control section 1007, and an amplification adjustment section 1010 have the similar functions as respective functional blocks of a configuration shown in FIG. 9 except for later-described points.

A subscriber class judgment section 1009 has a function of classifying subscribers of mobile terminals currently under communication into a priority subscriber class and a general subscriber class by subscriber numbers and outputs the information.

The reverse channel error rate judgment section 1003 of the radio base station has a predetermined value of the worst frame error rate, which is allowable for communication in the reverse channel, as the threshold value and a continuous degradation counter with its threshold of the counter value indicating that reverse channel being degraded, for the priority subscribers. The forward channel error rate judgment section 1004 has a predetermined value of the worst frame error rate, which is allowable for communication in the forward channel, as the threshold value for the priority subscribers.

It is a measure taken for such a case that a judgment of degradation of communication quality of radio signals is to be varied depending on the nature of the subscriber. If the mobile terminal has public properties such as, for example, usefulness in police stations, fire stations, or other government and municipal offices and has a higher priority than the general subscribers, it may not be preferable in some cases to give the same criterion as for the general subscribers to control transmission power as described above, degrade a channel quality when a quality of the channel in other direction becomes degraded.

Accordingly, although a transmission power control is performed in the same method as that described above for the general subscribers, a threshold for a judgment of a quality degradation is set to a relatively high level with the control operations as described above for a mobile terminal to which the higher priority subscriber class is given, so that such a state that is judged to be a quality degradation in the mobile terminal for the general subscribers is not judged to be a quality degradation in the mobile terminal having the higher priority.

Instead, it is possible to apply a method of changing a calculation period of an error rate with the same threshold in both classes, for example to set a longer period for calculating an error rate for the higher priority subscriber class so as to prevent a communication quality from being judged to be degraded immediately after a deterioration of an error rate actually occurs.

In this manner, there are provided two types of judgment means, a general subscriber class and a priority subscriber class, for the reverse channel error rate judgment section 1003 and the forward channel error rate judgment section 1004.

When the radio base station communicates with the mobile terminal, the subscriber class judgment section 1009 obtains a subscriber number of the mobile terminal from data received in the decoder section 1002 and determines whether the mobile terminal is a priority subscriber or a general subscriber based on the subscriber number; if it is a priority subscriber, the subscriber class judgment section 1009 reports the information to the reverse channel error rate judgment section 1003 and the forward channel error rate judgment section 1004. When receiving the report of the subscriber class of the mobile terminal under communication from the subscriber class judgment section 1009, the reverse channel error rate judgment section 1003 and the forward channel error rate judgment section 1004 judges a communication quality in a manner corresponding to each subscriber class. On the basis of the judgment, a transmission power control is performed.

As described above, the transmission power control apparatus according to the present invention is capable of reducing interference, in a mobile communication adopting the CDMA system, with other communications caused by a transmission of an excessive power by decreasing an output of a channel in one direction (the reverse direction or the forward direction) if a communication quality of a channel in the other direction is degraded and is not likely to be improved.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A transmission power control apparatus provided in a radio base station of a mobile communication system, adopting a CDMA system, in which there exist a plurality of mobile terminals, each including a radio signal reception and transmission device for radio communication with the radio base station, and a forward channel error measuring device for measuring a frame error rate of the forward channel radio signals from the radio base station so as to report it as a forward channel frame error rate to the radio base station, and the radio base station including a radio signal transmission and reception device for radio communication with the mobile terminal, a reverse channel error detecting device for detecting received data errors of the reverse channel radio signals from the mobile terminal, and a reception field strength measuring device for measuring a reception field strength of the reverse channel radio signals, the transmission power control apparatus comprising:

the forward channel judging part for verifying communication quality of the forward channel based on the forward channel frame error rate reported from the mobile terminal, and judging a communication quality degradation when the forward channel frame error rate reported being worse than a predetermined threshold value with expecting no improvement; and a transmission power control part for controlling the transmission power of the forward channel based on the forward channel frame error rate reported, and controlling the transmission power of the reverse channel by providing instruction information of a transmission power increase to the mobile terminal when the reception field strength value actually having been measured being lower than an expected reception field strength value, based on the reverse channel frame error rate calculated, as the result of comparison, and providing instruction information of a transmission power decrease to the mobile terminal when the reception field strength value actually having been measured being higher than the expected reception field strength value, wherein the expected reception field strength value being set to a lower value than usual when having received the information of communication quality degradation of the forward channel from the communication quality of the forward channel judging part.

2. A transmission power control apparatus as in claim 1, further comprising:

a moving speed measuring part for measuring moving speed of the mobile terminal being communicating and outputting one of moving speed information of a high speed mode or a normal speed mode; and wherein the channel judging part being provided with two types of predetermined threshold values, for the normal speed mode and for the high speed mode respectively, for judging a communication quality degradation of the forward channel.

3. A transmission power control apparatus as in claim 2, further comprising:

a subscriber priority judgment part for discriminating subscriber class of the mobile terminal being communicating and outputting one of subscriber class information of a priority class or an ordinary class; and wherein the communication quality of the forward channel judging part being provided with additional two types of predetermined threshold values, for the priority class and for the ordinary class respectively, for judging a communication quality degradation of the forward channel.

4. A transmission power control apparatus as in claim 3, further comprising:

a subscriber priority judgment part for discriminating subscriber class of the mobile terminal being communicating and outputting one of subscriber class information of a priority class or an ordinary class; and wherein the forward channel transmission power controller being provided with additional two types of predetermined threshold values, for the priority class and for the ordinary class respectively, for judging a communication quality degradation of the forward channel.

5. A transmission power control apparatus provided in a radio base station of a mobile communication system, adopting a CDMA system, in which there exist a pulrality of mobile terminals, each including a radio signal reception and transmission device for radio comminication with the radio base station, and a forward channel error measuring device for measuring a frame error rate of the forward channel radio signals from the radio base station so as to report it as a forward channel frame error rate to the radio base station, and the radio base station including a radio signal transmission and reception device for radio communication with the mobile terminal, a reverse channel error detecting device for detecting received data errors of the reverse channel radio signals from the mobile terminal, and a reception field strength measuring device for measuring a reception field strength of the reverse channel radio signals, the transmission power control apparatus comprising:

a forward channel transmission power controller for controlling a transmission power of the forward channel radio signals based on the forward channel frame error rate obtained by a report from the mobile terminal, judging communication quality of the forward channel based on the forward channel frame error rate, and outputting information of communication quality degradation of the forward channel when judging result indicating the forward channel frame error rate being worse than a predetermined threshold value and expecting no improvement; and a reverse channel transmission power controller for comparing an expected reception field strength value, based on the reverse channel frame error rate calculated, with the reception field strength value of the reverse channel radio signals actually having been measured, and providing instruction information of a transmission power increase to the mobile terminal when the reception field strength value actually having been measured being lower than the expected reception field strength value, and providing instruction information of a transmission power decrease to the mobile terminal when the reception field strength value actually having been measured being higher than the expected reception field strength value, wherein the expected reception field strength value being set to a lower value than usual when having received the information of communication quality degradation of the forward channel from the forward channel transmission power controller.

6. A transmission power control apparatus as in claim 5, the forward channel transmission power controller comprising:

a forward channel error rate judgment section for obtaining the forward channel frame error rate reported by the mobile terminal, judging communication quality of the forward channel based on the forward channel frame error rate obtained, and outputting the forward channel frame error rate and information of communication quality degradation in the forward channel when judging the forward channel frame error rate being worse than a predetermined threshold value and expecting no improvement; and an output power control section for controlling a transmission power of the forward channel radio signals based on the forward channel frame error rate output from the forward channel error rate judgment section.

7. A transmission power control apparatus as in claim 6, further comprising:

a moving speed measuring part for measuring moving speed of the mobile terminal being communicating and outputting one of moving speed information of a high speed mode or a normal speed mode; and wherein the forward channel error rate judgment section being provided with two types of predetermined threshold values, for the normal speed mode and for the high speed mode respectively, for judging a communication quality degradation of the forward channel.

8. A transmission power control apparatus as in claim 7, further comprising:

a subscriber priority judgment part for discriminating subscriber class of the mobile terminal being communicating and outputting one of subscriber class information of a priority class or an ordinary class; and wherein the forward channel error rate judgment section being provided with additional two types of predetermined threshold values, for the priority class and for the ordinary class respectively, for judging a communication quality degradation of the forward channel.

9. A transmission power control apparatus as in claim 5, the reverse channel transmission power controller comprising:

a reverse channel error rate judgment section for calculating a reverse channel frame error rate based on received data errors detected, providing an expected reception field strength value based on the reverse channel frame error rate calculated, and outputting the expected reception field strength value with setting to a lower value than usual when having received the information of communication quality degradation of the forward channel from the forward channel transmission power controller; and a reception field strength judgment section for comparing the expected reception field strength value output from the reverse channel error rate judgment section with the reception field strength value of the reverse channel radio signals actually having been measured, and providing instruction information of a transmission power increase to the mobile terminal when the reception field strength value actually having been measured being lower than the expected reception field strength value and instruction information of a transmission power decrease to the mobile terminal when the reception field strength value actually having been measured being higher than the expected reception field strength value.

10. A transmission power control apparatus as in claim 5, further comprising:

a moving speed measuring part for measuring moving speed of the mobile terminal being communicating and outputting one of moving speed information of a high speed mode or a normal speed mode; and wherein the forward channel transmission power controller being provided with two types of predetermined threshold values, for the normal speed mode and for the high speed mode respectively, for judging a communication quality degradation of the forward channel.

11. A transmission power control apparatus provided in a radio base station of a mobile communication system, adopting a CDMA system, in which there exist a pulrality of mobile terminals, each including a radio signal reception and transmission device for radio comminication with the radio base station, and a forward channel error measuring device for measuring a frame error rate of the forward channel radio signals from the radio base station so as to report it as a forward channel frame error rate to the radio base station, and the radio base station including a radio signal transmission and reception device for radio communication with the mobile terminal, a reverse channel error detecting device for detecting received data errors of the reverse channel radio signals from the mobile terminal, and a reception field strength measuring device for measuring a reception field strength of the reverse channel radio signals, the transmission power control apparatus comprising:

a communication quality judging part for verifying communication quality of the forward channel based on the forward channel frame error rate reported from the mobile terminal and judging a communication quality of the forward channel degradation when the forward channel frame error rate reported being worse than a predetermined threshold frame error rate for the forward channel with expecting no improvement, and for verifying communication quality of the reverse channel based on a reverse channel frame error rate calculated by detected received data errors and judging a communication quality of the reverse channel degradation when the reverse channel frame error rate calculated being worse than a predetermined threshold frame error rate for the reverse channel with continuing the same state for predetermined periods of timing; and a transmission power control part for controlling the transmission power of the forward channel, based on the forward channel frame error rate reported, with setting a lower value than usual when having received information of a degraded communication quality of the reverse channel from the communication quality judging part, and controlling the transmission power of the reverse channel by providing instruction information of a transmission power increase to the mobile terminal when the reception field strength value actually having been measured being lower than an expected reception field strength value, based on the reverse channel frame error rate calculated, as the result of comparison, and providing instruction information of a transmission power decrease to the mobile terminal when the reception field strength value actually having been measured being higher than the expected reception field strength value, wherein the expected reception field strength value being set to a lower value than usual when having received information of communication quality degradation of the forward channel from the communication quality judging part.

12. A transmission power control apparatus as in claim 11, further comprising:

a moving speed measuring part for measuring moving speed of the mobile terminal being communicating and outputting one of moving speed information of a high speed mode or a normal speed mode; and wherein the communication quality judging part being provided with two types of predetermined threshold values, for the normal speed mode and for the high speed mode respectively, for judging a communication quality degradation of the forward channel, and provided with two types of predetermined threshold values or two types of predetermined periods of timing, for the normal speed mode and for the high speed mode respectively, for judging a communication quality degradation of the reverse channel.

13. A transmission power control apparatus as in claim 12, further comprising:

a subscriber priority judgment part for discriminating subscriber class of the mobile terminal being communicating and outputting one of subscriber class information of a priority class or an ordinary class; and wherein the communication quality judging part being provided with additional two types of predetermined threshold values, for the priority class and for the ordinary class respectively, for judging a communication quality degradation of the forward channel, and provided with additional two types of predetermined threshold values or two types of predetermined periods of timing, for the priority class and for the ordinary class respectively, for judging a communication quality degradation of the reverse channel.

14. A transmission power control apparatus provided in a radio base station of a mobile communication system, adopting a CDMA system, in which there exist a pulrality of mobile terminals, each including a radio signal reception and transmission device for radio comminication with the radio base station, and a forward channel error measuring device for measuring a frame error rate of the forward channel radio signals from the radio base station so as to report it as a forward channel frame error rate to the radio base station, and the radio base station including a radio signal transmission and reception device for radio communication with the mobile terminal, a reverse channel error detecting device for detecting received data errors of the reverse channel radio signals from the mobile terminal, and a reception field strength measuring device for measuring a reception field strength of the reverse channel radio signals, the transmission power control apparatus comprising:

a forward channel transmission power controller for controlling a transmission power of the forward channel radio signals based on the forward channel frame error rate, obtained by a report from the mobile terminal, with setting a lower value than usual when having received information of a degraded communication quality of the reverse channel, judging communication quality of the forward channel based on the forward channel frame error rate, and outputting information of communication quality degradation of the forward channel when judging result indicating the forward channel frame error rate being worse than a predetermined threshold frame error rate of the forward channel and expecting no improvement; and a reverse channel transmission power controller for comparing an expected reception field strength value, based on the reverse channel frame error rate calculated, with the reception field strength value of the reverse channel radio signals actually having been measured, and providing instruction information of a transmission power increase to the mobile terminal when the reception field strength value actually having been measured being lower than the expected reception field strength value, providing instruction information of a transmission power decrease to the mobile terminal when the reception field strength value actually having been measured being higher than the expected reception field strength value, wherein the expected reception field strength value being set to a lower value than usual when having received the information of communication quality degradation of the forward channel, judging communication quality of the reverse channel based on the reverse channel frame error rate calculated, and outputting information of communication quality degradation of the reverse channel when judging result indicating the reverse channel frame error rate being worse than a predetermined threshold frame error rate of the reverse channel and continuing the same state for predetermined periods of timing.

15. A transmission power control apparatus as in claim 14, the forward channel transmission power controller comprising:

a forward channel error rate judgment section for obtaining the forward channel frame error rate reported by the mobile terminal, judging communication quality of the forward channel based on the forward channel frame error rate obtained, and outputting the forward channel frame error rate and information of communication quality degradation of the forward channel when judging the forward channel frame error rate being worse than a predetermined threshold frame error rate of the forward channel and expecting no improvement; and an output power control section for controlling a transmission power of the forward channel radio signals based on the forward channel frame error rate output from the forward channel error rate judgment section with setting to a lower value than usual when having received information of communication degradation of the reverse channel.

16. A transmission power control apparatus as in claim 14, the reverse channel transmission power controller comprising:

a reverse channel error rate judgment section for calculating a reverse channel frame error rate based on received data errors detected, providing an expected reception field strength value based on the reverse channel frame error rate calculated, and outputting the expected reception field strength value with setting to a lower value than usual when having received the information of communication quality degradation in the forward channel from the forward channel transmission power controller, judging communication quality of the reverse channel based on the reverse channel frame error rate calculated, and outputting information of communication quality degradation of the reverse channel when judging result indicating the reverse channel frame error rate being worse than a predetermined threshold frame error rate of the reverse channel and continuing the same state for predetermined periods of timing; and a reception field strength judgment section for comparing the expected reception field strength value output from the reverse channel error rate judgment section with the reception field strength value of the reverse channel radio signals actually having been measured, and providing instruction information of a transmission power increase to the mobile terminal when the reception field strength value actually having been measured being lower than the expected reception field strength value and instruction information of a transmission power decrease to the mobile terminal when the reception field strength value actually having been measured being higher than the expected reception field strength value.

17. A transmission power control apparatus as in claim 14, further comprising:

a moving speed measuring part for measuring moving speed of the mobile terminal being communicating and outputting one of moving speed information of a high speed mode or a normal speed mode; and wherein the forward channel transmission power controller being provided with two types of predetermined threshold values, for the normal speed mode and for the high speed mode respectively, for judging a communication quality degradation of the forward channel, and the reverse channel transmission power controller being provided with two types of predetermined threshold values or two types of predetermined periods of timing, for the normal speed mode and for the high speed mode respectively, for judging a communication quality degradation of the reverse channel.

18. A transmission power control apparatus as in claim 17, further comprising:

a subscriber priority judgment part for discriminating subscriber class of the mobile terminal being communicating and outputting one of subscriber class information of a priority class or an ordinary class; and wherein the forward channel transmission power controller being provided with additional two types of predetermined threshold values, for the priority class and for the ordinary class respectively, for judging a communication quality degradation of the forward channel, and the reverse channel transmission power controller being provided with two types of predetermined threshold values or two types of predetermined periods of timing, for the priority class and for the normal class respectively, for judging a communication quality degradation of the reverse channel.

19. A transmission power control apparatus provided in a radio base station of a mobile communication system, adopting a CDMA system, in which there exist a plurality of mobile terminals, each including a radio signal reception and transmission device for radio communication with the radio base station, and a forward channel error measuring device for measuring a frame error rate of the forward channel radio signals from the radio base station so as to report it as a forward channel frame error rate to the radio base station, and the radio base station including a radio signal transmission and reception device for radio communication with the mobile terminal, a reverse channel error detecting device for detecting received data errors of the reverse channel radio signals from the mobile terminal, and a reception field strength measuring device for measuring a reception field strength of the reverse channel radio signals, the transmission power control apparatus comprising:

a communication quality judging part for verifying communication quality of the forward channel based on the forward channel frame error rate reported from the mobile terminal and judging a communication quality of the forward channel degradation when the forward channel frame error rate reported being worse than a predetermined threshold frame error rate for the forward channel with expecting no improvement, and for verifying communication quality of the reverse channel based on a reverse channel frame error rate calculated by detected received data errors and judging a communication quality of the reverse channel degradation when the reverse channel frame error rate calculated being worse than a predetermined threshold frame error rate for the reverse channel with continuing the same state for predetermined periods of timing; and a transmission power control part for controlling the transmission power of the forward channel, based on the forward channel frame error rate reported, with setting a lower value than usual when having received information of a degraded communication quality of the reverse channel, and when having received information of a degraded communication quality of the forward channel regardless of communication quality of the reverse channel, from the communication quality judging part, and controlling the transmission power of the reverse channel by providing instruction information of a transmission power increase to the mobile terminal when the reception field strength value actually having been measured being lower than an expected reception field strength value, based on the reverse channel frame error rate calculated, as the result of comparison, and providing instruction information of a transmission power decrease to the mobile terminal when the reception field strength value actually having been measured being higher than the expected reception field strength value, wherein the expected reception field strength value being set to a lower value than usual when having received information of communication quality degradation of the forward channel, and when having received information of communication quality degradation of the reverse channel regardless of communication quality of the forward channel, from the communication quality judging part.

20. A transmission power control apparatus as in claim 19, further comprising:

a moving speed measuring part for measuring moving speed of the mobile terminal being communicating and outputting one of moving speed information of a high speed mode or a normal speed mode; and wherein the communication quality judging part being provided with two types of predetermined threshold values, for the normal speed mode and for the high speed mode respectively, for judging a communication quality degradation of the forward channel, and provided with two types of predetermined threshold values or two types of predetermined periods of timing, for the normal speed mode and for the high speed mode respectively, for judging a communication quality degradation of the reverse channel.

21. A transmission power control apparatus as in claim 20, further comprising:

a subscriber priority judgment part for discriminating subscriber class of the mobile terminal being communicating and outputting one of subscriber class information of a priority class or an ordinary class; and wherein the communication quality judging part being provided with additional two types of predetermined threshold values, for the priority class and for the ordinary class respectively, for judging a communication quality degradation of the forward channel, and provided with additional two types of predetermined threshold values or two types of predetermined periods of timing, for the priority class and for the ordinary class respectively, for judging a communication quality degradation of the reverse channel.

22. A transmission power control apparatus provided in a radio base station of a mobile communication system, adopting a CDMA system, in which there exist a plurality of mobile terminals, each including a radio signal reception and transmission device for radio communication with the radio base station, and a forward channel error measuring device for measuring a frame error rate of the forward channel radio signals from the radio base station so as to report it as a forward channel frame error rate to the radio base station, and the radio base station including a radio signal transmission and reception device for radio communication with the mobile terminal, a reverse channel error detecting device for detecting received data errors of the reverse channel radio signals from the mobile terminal, and a reception field strength measuring device for measuring a reception field strength of the reverse channel radio signals, the transmission power control apparatus comprising:

a forward channel transmission power controller for judging communication quality of the forward channel based on the forward channel frame error rate, outputting information of communication quality degradation of the forward channel when judging result indicating the forward channel frame error rate being worse than a predetermined threshold frame error rate of the forward channel and expecting no improvement, and controlling a transmission power of the forward channel radio signals based on the forward channel frame error rate, obtained by a report from the mobile terminal, with setting a lower value than usual when having received information of a degraded communication quality of the reverse channel, and when having judged communication quality of the forward channel being degraded regardless of communication quality of the reverse channel; and a reverse channel transmission power controller for judging communication quality of the reverse channel based on the reverse channel frame error rate calculated, outputting information of communication quality degradation of the reverse channel when judging result indicating the reverse channel frame error rate being worse than a predetermined threshold frame error rate of the reverse channel and continuing the same state for predetermined periods of timing, comparing an expected reception field strength value, based on the reverse channel frame error rate calculated, with the reception field strength value of the reverse channel radio signals actually having been measured, providing instruction information of a transmission power increase to the mobile terminal when the reception field strength value actually having been measured being lower than the expected reception field strength value, and providing instruction information of a transmission power decrease to the mobile terminal when the reception field strength value actually having been measured being higher than the expected reception field strength value, wherein the expected reception field strength value being set to a lower value than usual when having received the information of communication quality degradation of the forward channel, and when having judged communication quality degradation of the reverse channel regardless of communication quality of the forward channel.

23. A transmission power control apparatus as in claim 22, further comprising:

a moving speed measuring part for measuring moving speed of the mobile terminal being communicating and outputting one of moving speed information of a high speed mode or a normal speed mode; and wherein the forward channel transmission power controller being provided with two types of predetermined threshold values, for the normal speed mode and for the high speed mode respectively, for judging a communication quality degradation of the forward channel, and the reverse channel transmission power controller being provided with two types of predetermined threshold values or two types of predetermined periods of timing, for the normal speed mode and for the high speed mode respectively, for judging a communication quality degradation of the reverse channel.

24. A transmission power control apparatus as in claim 23, further comprising:

a subscriber priority judgment part for discriminating subscriber class of the mobile terminal being communicating and outputting one of subscriber class information of a priority class or an ordinary class; and wherein the forward channel transmission power controller being provided with additional two types of predetermined threshold values, for the priority class and for the ordinary class respectively, for judging a communication quality degradation of the forward channel, and the reverse channel transmission power controller being provided with additional two types of predetermined threshold values or two types of predetermined periods of timing, for the priority class and for the ordinary class respectively, for judging a communication quality degradation of the reverse channel.

25. A transmission power control apparatus provided in a radio base station of a mobile communication system, adopting a CDMA system, in which there exist a plurality of mobile terminals, each including a radio signal reception and transmission device for radio communication with the radio base station, and a forward channel error measuring device for measuring a frame error rate of the forward channel radio signals from the radio base station so as to report it as a forward channel frame error rate to the radio base station, and the radio base station including a radio signal transmission and reception device for radio communication with the mobile terminal, a reverse channel error detecting device for detecting received data errors of the reverse channel radio signals from the mobile terminal, and a reception field strength measuring device for measuring a reception field strength of the reverse channel radio signals, the transmission power control apparatus comprising:

a forward channel error rate judgment section for obtaining the forward channel frame error rate reported by the mobile terminal, judging communication quality of the forward channel based on the forward channel frame error rate obtained, and outputting the forward channel frame error rate and information of communication quality degradation of the forward channel when judging the forward channel frame error rate being worse than a predetermined threshold frame error rate of the forward channel and expecting no improvement;

a reverse channel error rate judgment section for calculating a reverse channel frame error rate based on received data errors detected, judging communication quality of the reverse channel based on the reverse channel frame error rate calculated, outputting information of communication quality degradation of the reverse channel when judging result indicating the reverse channel frame error rate being worse than a predetermined threshold frame error rate of the reverse channel and continuing the same state for predetermined periods of timing, providing an expected reception field strength value based on the reverse channel frame error rate calculated, and outputting the expected reception field strength value with setting to a lower value than usual when having received the information of communication quality degradation of the forward channel from the forward channel error rate judgment section, and when having judged communication quality degradation of the reverse channel regardless of communication quality of the forward channel;

a reception field strength judgment section for comparing the expected reception field strength value output from the reverse channel error rate judgment section with the reception field strength value of the reverse channel radio signals actually having been measured, and providing instruction information of a transmission power increase to the mobile terminal when the reception field strength value actually having been measured being lower than the expected reception field strength value and instruction information of a transmission power decrease to the mobile terminal when the reception field strength value actually having been measured being higher than the expected reception field strength value; and an output power control section for controlling a transmission power of the forward channel radio signals based on the forward channel frame error rate output from the forward channel error rate judgment section with setting to a lower value than usual when having received information of communication degradation of the reverse channel, and when having received information of communication degradation of the forward channel regardless of communication quality of the reverse channel.

* * * * *